(12) United States Patent  
Mathias et al.

(10) Patent No.: US 10,545,583 B2  
(45) Date of Patent: Jan. 28, 2020

(54) MODIFYING A HIGHLIGHTING FUNCTION ON A DISPLAY BASED ON CONTENT

(71) Applicant: Logitech Europe S.A., Lausanne (CH)

(72) Inventors: Guillaume Mathias, Evian (FR); Christophe Dayer, Onex (CH); Martin Caspar Ruegg, Muttenz (CH); Marten Helwig, Bern-Hinterkappelen (CH); Patrick Cerisier, Annecy le Vieux (FR); Philippe Chazot, Saint-Jorioz (FR); Patrick Salamin, Sion (CH); Mauricio Garcia, Lausanne (CH); Nicolas Ramond, Lugrin (FR); Yohan Baillet, Amphion les Bains (FR)

(73) Assignee: Logitech Europe S.A., Lausanne (CH)

( * ) Notice: Subject to any disclaimer, the term of this patent is extended or adjusted under 35 U.S.C. 154(b) by 330 days.

(21) Appl. No.: 15/389,232

(22) Filed: Dec. 22, 2016

(65) Prior Publication Data

US 2018/0173397 A1 Jun. 21, 2018

Related U.S. Application Data

(60) Provisional application No. 62/435,378, filed on Dec. 16, 2016.

(51) Int. Cl.  
*G06F 3/0481* (2013.01)  
*G06F 3/0346* (2013.01)  
(Continued)

(52) U.S. Cl.  
CPC ............ *G06F 3/0346* (2013.01); *G06F 3/016* (2013.01); *G06F 3/02* (2013.01); *G06F 3/0485* (2013.01);  
(Continued)

(58) Field of Classification Search  
CPC ............ G06F 3/04812; G06F 3/04842; G06F 2203/04803; G06F 2203/04804; G06F 3/04845  
See application file for complete search history.

(56) References Cited

U.S. PATENT DOCUMENTS

| 2006/0061597 A1* | 3/2006 | Hui ...................... G06F 3/0481 345/629 |
| 2007/0176944 A1* | 8/2007 | Brown .................. G06F 3/0481 345/592 |

(Continued)

*Primary Examiner* — Anil K Bhargava  
(74) *Attorney, Agent, or Firm* — Kilpatrick Townsend & Stockton LLP

(57) ABSTRACT

A computer-implemented method includes detecting a first window being displayed on a display of a host computing device, detecting graphical content on the first window, generating a second window (overlay) on the display, wherein the overlay is configured on a window layer above the first window, and changing graphical qualities of the overlay based on the detected graphical content of the first window. The graphical qualities may include at least one of a shape, size, color, transparency, or opacity of the overlay. The method can further include receiving input data corresponding to a movement of a cursor on the first window, setting a transparency of an area around the cursor to a first transparency, and setting a transparency of a remainder of the overlay to a second transparency, such that the area around the cursor appears to highlight a corresponding area of the graphical content on the first window.

16 Claims, 17 Drawing Sheets

(51) Int. Cl.
*G06F 3/16* (2006.01)
*G06F 3/0485* (2013.01)
*G06F 3/0484* (2013.01)
*G06F 3/02* (2006.01)
*H04W 76/14* (2018.01)
*G06F 3/01* (2006.01)
*H04W 52/02* (2009.01)
*H04W 4/80* (2018.01)

(52) U.S. Cl.
CPC ...... *G06F 3/04812* (2013.01); *G06F 3/04842* (2013.01); *G06F 3/04845* (2013.01); *G06F 3/165* (2013.01); *H04W 52/0274* (2013.01); *H04W 76/14* (2018.02); *G06F 2203/0384* (2013.01); *G06F 2203/04803* (2013.01); *G06F 2203/04804* (2013.01); *H04W 4/80* (2018.02)

(56) References Cited

U.S. PATENT DOCUMENTS

| | | | |
|---|---|---|---|
| 2007/0192719 A1* | 8/2007 | Chellis | G06F 3/04842 715/767 |
| 2007/0204232 A1* | 8/2007 | Ray | G06F 16/9577 715/738 |
| 2008/0163090 A1* | 7/2008 | Cortright | G06F 3/0481 715/771 |
| 2012/0092438 A1* | 4/2012 | Guzman Suarez | H04N 7/15 348/14.03 |
| 2016/0234564 A1* | 8/2016 | Holyoak | H04N 21/812 |
| 2016/0267060 A1* | 9/2016 | Skirpa | G06F 3/0481 |
| 2017/0124740 A1* | 5/2017 | Campbell | G06F 3/04847 |
| 2017/0147568 A1* | 5/2017 | Chen | G06F 9/451 |
| 2018/0068475 A1* | 3/2018 | Blue | G06T 11/60 |

* cited by examiner

MODIFYING A HIGHLIGHTING FUNCTION ON A DISPLAY BASED ON CONTENT

CROSS-REFERENCES TO RELATED APPLICATIONS

This application is a non-provisional application and claims the benefit and priority of U.S. Provisional Application No. 62/435,378, filed on Dec. 16, 2016, and titled "HAND-HELD INPUT DEVICE," which is hereby incorporated by reference in its entirety for all purposes.

The following regular U.S. patent applications (including this one) are being filed concurrently, and the entire disclosure of the other applications are incorporated by reference into this application for all purposes:

- application Ser. No. 15/389,215, filed Dec. 22, 2016, entitled "UNINTERRUPTABLE OVERLAY ON A DISPLAY";
- application Ser. No. 15/389,225, filed Dec. 22, 2016, entitled "AUTOMATIC SELECTION OF A WIRELESS CONNECTIVITY PROTOCOL FOR AN INPUT DEVICE"; and
- application Ser. No. 15/389,229, filed Dec. 22, 2016, entitled "AUTOMATIC CONFIGURATION OF AN INPUT DEVICE BASED ON CONTEXTUAL USAGE".

BACKGROUND

Slide-based presentations have been a mainstay in the office workplace for decades. Technologies have evolved from early carousel slide projectors and single-page transparency projectors to modern digital presentations using contemporary software such as PowerPoint®, Keynote®, Prezi®, Google Slides®, and the like.

Until recently, most presentations required at a person to remain tied to the desktop or laptop computer operating the presentation software to manually control the flow of the presentation (e.g., forwarding, pausing, or returning to a previous slide) with an input device (e.g., computer mouse, touch pad, arrow keys, etc.). This can detrimentally affect the quality and dynamics of a good presentation as the presenter is unable to move about and fully engage with the audience. Even in situations where a second person operates the software and the presenter is free to move about the room, constantly having to remind the operator to change slides can stifle continuity and may be distracting to viewers.

Newer developments include multi-function presentation devices (e.g., hand-held input devices) that can allow the presenter to perform simple functions like slide advancement, laser pointing, and long range. However, many of these devices have non-intuitive or confusing interfaces, cumbersome button arrangements, complicated programming protocols, or compatibility issues. Better hand-held input devices are needed.

BRIEF SUMMARY

In some embodiments, a computer-implemented method includes detecting a first window being displayed on a display of a host computing device, detecting graphical content on the first window, generating a second window (overlay) on the display of the host computing device, where the overlay is configured on a window layer above the first window, and changing graphical qualities of the overlay based on the detected graphical content of the first window. The graphical qualities of the overlay may include at least one of a shape, size, color, transparency, or opacity of the overlay. The method can further include receiving input data corresponding to a movement of a cursor on the first window, setting a transparency of an area around the cursor to a first transparency, and setting a transparency of a remainder of the overlay to a second transparency, such that the area around the cursor appears to highlight a corresponding area of the graphical content on the first window.

In certain embodiments, the method can further include determining a color associated with the graphical content on the first window, determining a contrasting color based on the determined color, and setting a color of at least a portion of the area around the cursor to the determined contrasting color. Alternatively or additionally, the method can include receiving input data corresponding to a movement of a cursor on the first window, defining an area around the cursor, determining one or more colors associated with the graphical content inside the defined area around the cursor, determining one or more colors associated with the graphical content outside the defined area around the cursor, determining a visibility factor associated with a difference between the one or more colors associated with the graphical content inside the defined area around the cursor with the one or more colors associated with the graphical content outside the defined area around the cursor, and setting a color of the area inside the defined area around the cursor based on the determined visibility factor.

In some implementations, the method may include detecting a selectable element in the graphical content, determining a shape of the selectable element, setting a transparency of an area around the selectable element to a first transparency, and setting a transparency of a remainder of the overlay to a second transparency, such that the area around the selectable element appears to be highlighted. In some cases, the selectable element can be a first selectable element, and the method can further include detecting a second selectable element in the graphical content, receiving input data corresponding to a movement of a cursor on the first window, and selecting one of the first selectable element or the second selectable element based on the movement of the cursor, where the setting the transparency is applied to the selected first or second selectable element. Alternatively or additionally, the selectable element can be a first selectable element, and the method can further include detecting a second selectable element in the graphical content, determining a location of the first selectable element and the second selectable element, receiving input data corresponding to a movement of a cursor on the first window, determining a distance between the cursor and the first and second selectable elements, and selecting one of the first selectable element or the second selectable element based on their corresponding distance to the cursor.

In certain embodiments, the method can include detecting a selectable element in the graphical content, detecting a sub-element contained within in the selectable element, determining a shape of the sub-element, setting a transparency of an area around the sub-element on the overlay to a first transparency, and setting a transparency of a remainder of the overlay to a second transparency, such that the area around the sub-element appears to be highlighted. The method can further include determining a shape of the selectable element, receiving input data from an input device, and switching between highlighting the selectable element and the sub-element based on the received input data from the input device, where when the selectable element is highlighted, the method can include setting a transparency of an area around the selectable element on the overlay to the first transparency, and setting a transparency of a remainder of the overlay to a second transparency, such that the area around the selectable element appears to be highlighted.

In some embodiments, the sub-element can be a first sub-element, and the method can further include detecting a second sub-element of the selectable element, receiving input data corresponding to a movement of a cursor on the first window, and selecting one of the first sub-element or second sub-elements based on the movement of the cursor, where the setting the transparency is applied to the selected first or second sub-element. Alternatively or additionally, the method can include detecting a second sub-element of the selectable element, receiving input data from an input device, and switching between the first sub-element or second sub-elements based on the input data from the input device, where the setting the transparency is applied to the selected first or second sub-element.

In certain embodiments, a computer-implemented system for establishing a wireless connection with a mobile input device includes one or more processors and one or more non-transitory computer-readable storage mediums containing instructions configured to cause the one or more processors to perform operations including detecting a first window being displayed on a display of a host computing device, detecting graphical content on the first window, generating a second window (overlay) on the display of the host computing device, where the overlay is configured on a window layer above the first window, and changing graphical qualities of the overlay based on the detected graphical content of the first window. The graphical qualities of the overlay may include at least one of a shape, size, color, transparency, or opacity of the overlay. Alternatively or additionally, the one or more non-transitory computer-readable storage mediums further contain instructions configured to cause the one or more processors to perform operations including receiving input data corresponding to a movement of a cursor on the first window, setting a transparency of an area around the cursor to a first transparency, and setting a transparency of a remainder of the overlay to a second transparency, such that the area around the cursor appears to highlight a corresponding area of the graphical content on the first window. The instructions may further be configured to cause the one or more processors to perform operations including detecting a selectable element in the graphical content, determining a shape of the selectable element, setting a transparency of an area around the selectable element to a first transparency, and setting a transparency of a remainder of the overlay to a second transparency, such that the area around the selectable element appears to be highlighted.

In further embodiments, a non-transitory computer-program product tangibly embodied in a machine-readable non-transitory storage medium can include instructions configured to cause one or more processors to detect a first window being displayed on a display of a host computing device, detect graphical content on the first window, generate a second window (overlay) on the display of the host computing device, wherein the overlay is configured on a window layer above the first window, and change graphical qualities of the overlay based on the detected graphical content of the first window. The graphical qualities of the overlay may include at least one of a shape, size, color, transparency, or opacity of the overlay. The instructions can be further configured to cause one or more processors to receive input data corresponding to a movement of a cursor on the first window, set a transparency of an area around the cursor to a first transparency, and set a transparency of a remainder of the overlay to a second transparency, such that the area around the cursor appears to highlight a corresponding area of the graphical content on the first window. Alternatively or additionally, the instructions can be further configured to cause one or more processors to detect a selectable element in the graphical content, determine a shape of the selectable element, set a transparency of an area around the selectable element to a first transparency, and set a transparency of a remainder of the overlay to a second transparency, such that the area around the selectable element appears to be highlighted.

BRIEF DESCRIPTION OF THE DRAWINGS

The detailed description is set forth with reference to the accompanying figures.

DETAILED DESCRIPTION

Aspects of the present disclosure relate generally to input devices, and in particular to hand-held input devices for controlling aspects of a presentation, according to certain embodiments.

In the following description, various embodiments of a hand-held input device will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Some aspects of the invention include a method for identifying graphical content on a display and highlighting aspects of the graphical content using an input device. For instance, a user may be performing a speech using presentation software (e.g., PowerPoint®) and a presenting device (e.g., a "clicker"). Instead of having to install driver software to access each type of application being used, aspects of the invention can determine aspects of the graphical content on the display via image processing and highlight various objects (e.g., selectable elements, sub-elements, etc.) without additional software, drivers, or other potentially cumbersome or otherwise unavailable input device configurations to make for a highly adaptive, plug-and-play device experience to allow a user to perform highlighting and magnification functions (among other features) quickly and reliably without any specialized software setups. In some embodiments, a method to implement these features can include a detecting a first window being displayed on a display of a host computing device, detecting graphical content on the first window, generating a second window (overlay) on the display of the host computing device, where the overlay is configured on a window layer above the first window, and changing graphical qualities of the overlay based on the detected graphical content of the first window. The graphical qualities of the overlay may include at least one of a shape, size, color, transparency, or opacity of the overlay. The method can further include receiving input data corresponding to a movement of a cursor on the first window, setting a transparency of an area around the cursor to a first transparency, and setting a transparency of a remainder of the overlay to a second transparency, such that the area around the cursor appears to highlight a corresponding area of the graphical content on the first window.

Figure 1:
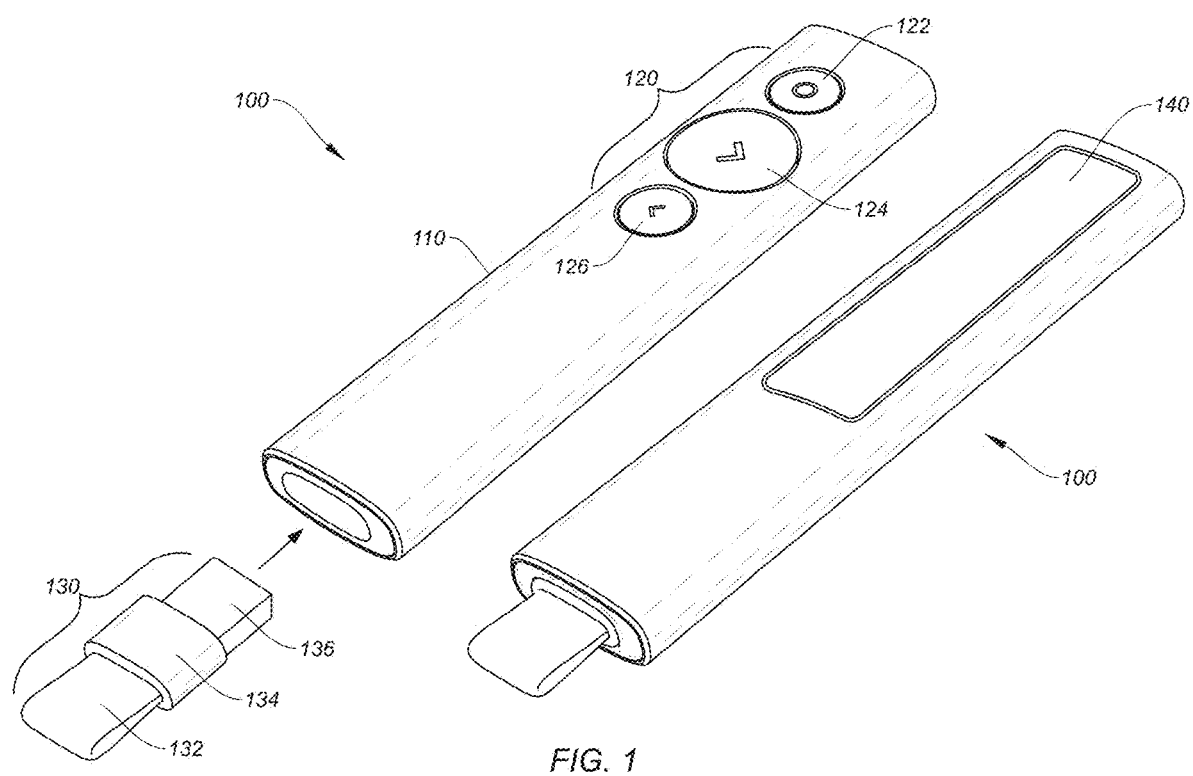
FIG. 1 shows a mobile hand-held input device, according to certain embodiments.

FIG. 1 shows a mobile hand-held input device 100, according to certain embodiments. Mobile hand-held input device ("input device") 100 can include housing 110, input interface 120, and receiver 130. Housing 110 is shown having an oval shaped cross-section and a rounded rectangular shape in top plan view to make for an ergonomically formed input device that can be comfortably held, manipulated, and interfaced by a user's hand. Housing 110 can be formed of any suitable materials including metal (e.g., aluminum, stainless steel, alloy, etc.), plastic, rubber, or hybrid material, as would be understood by one of ordinary skill in the art. Housing 110 can further include non-slip features to improve a user's grip on input device 100, such as non-slip portion 140, which can be comprised of any suitable non-slip material (e.g., rubber, plastic, knurled metal, etc.). Input device 100 can also be implemented in any form factor (e.g., shape, size, etc.) including wearables (e.g., smart watches, eye wear, etc.), smart phones, or other preferably mobile devices. In some embodiments, input device 100 can be operated by system 1700 of FIG. 17.

Input interface 120 can include any suitable user interface including, but not limited to, one or more buttons, touch and/or motion sensors, user controls (e.g., joystick, pointing stick, trackball, etc.), a microphone to facilitate voice recognition and command recognition, or the like. One of ordinary skill in the art would understand the many variations, modifications, and alternative embodiments thereof.

Referring to FIG. 1, input interface 120 can include top button 122, center button 124, and bottom button 126, according to certain embodiments. The arrangement of buttons 122-126 can be advantageous as it may provide unmistaken navigation and control. For example, center button 124 is larger than top button 122 and bottom button 126, allowing a user to easily determine which button is being interfaced without requiring visual confirmation. In some cases, the surface of the buttons can be modified to have different surface shapes (e.g., convex, concave), different materials (e.g., rubber, plastic, metal, etc.), different surface types (e.g., smooth, rough, patterned), or the like. Each button can be user programmable (or maintain factory default settings) to include any number of functions, which may be fixed (e.g., remain set until reprogrammed) or configurable to change dynamically based on contextual usage. For instance, a button can be dynamically and automatically programmed to generate play/pause commands when a particular slide in presentation software includes an embedded audio or video link. In another scenario, one or more buttons can be automatically configured to control scrolling when a spreadsheet application is running, or provide a magnifying feature when certain font sizes (e.g., less than 10 pt.) are included on a slide. One of ordinary skill in the art would understand the many variations, modifications, and alternative embodiments thereof.

In certain embodiments, top button 122 can be configured to be a cursor button such that a click can function as a mouse left click, and pressing and holding can control cursor movement on a corresponding display or highlighting functions. Center button 124 can be configured to functions as a "Next" button such that a click generates a "next slide" command and pressing and holding can perform a highlighting function, or alternatively volume control, scrolling, panning, custom keystrokes, or other suitable function. Bottom button 126 can be configured to function as a "Back" button such that a click generates a "previous slide" command and pressing and holding can perform a focus screen function, or alternatively volume control, scrolling, panning, custom keystrokes, or other suitable function. In some embodiments, center button 124 can function as a "left click" button, double clicking center button 124 may switch to a highlighting mode, and pressing/holding center button 124 may move a cursor or implement a highlighting function, as further discussed below. In some implementations, top button 122 can be figured to generate a next slide command in response to a single one click, or "fast forward" through slides and may be reprogrammed to blank the screen, perform volume, scrolling, and/or panning controls, or generate a custom keystroke in response to a press and hold command. In some embodiments, bottom button 126 can be configured to perform a "previous slide" command in response to a single click, or "fast backward" through blank the screen, perform volume, scrolling, and/or panning controls, or generate a custom keystroke in response to a press and hold command. One of ordinary skill in the art would understand the many variations, modifications, and alternative embodiments thereof.

In some embodiments, a movement of the input device can be configured to control certain features on a display. Input device movement can be tracked in three dimensions (e.g., x, y, z dimensions in Cartesian coordinate system) using one or more accelerometers, gyroscopes, or other inertial measurement unit. In some cases, an upward/downward (e.g., z-direction) movement may control a volume of a media player, scrolling a document, adjusting contrast or brightness on an image, or the like. Alternatively or additionally, a side-to-side movement (e.g., x-direction) may control a media playback point or cycle between modes of operation (e.g., audio/mute, enter/exit document (e.g., navigate embedded spreadsheet), mono/stereo playback, etc.). One of ordinary skill in the art would understand the many variations, modifications, and alternative embodiments thereof that utilize three-dimensional (3D) movement of the input device to control content on a display.

Receiver 130 can be a wireless transceiver that can be communicatively coupled to input device 100. Receiver 130 can enable bidirectional communication between input device 100 and a host computing device (not shown), such as a desktop computer, laptop computer, tablet computer, or the like. In some embodiments, receiver 130 can be a dongle having a wireless communication protocol operating at 2.4 Ghz. Alternatively or additionally, receiver 130 can operate at other frequencies, as would be understood by one of ordinary skill in the art. Receiver 130 can be configured to fit inside a cavity within housing 110, as shown in FIG. 1, and may include a strap 132, a body 134, and insert 136. Strap 132 is coupled to the receiver body 134 and can protrude from housing 110 when receiver 130 is fully inserted in the cavity to provide a method of retrieving receiver 130 from the cavity. Insert 136 is shown as a universal serial bus (USB)-C type interface to couple to a port for a host computing device, however any suitable type of interface (e.g., parallel/serial, FireWire, etc.) can be used.

Multi-Connectivity

In some embodiments, a mobile hand-held input device may be configured to couple with any type of host computing device having any suitable operating system and wireless communications protocol, as further discussed below. In some cases, a communicative connection hierarchy may be established where the input device will opt to connect to a first host computing device (e.g., using receiver 130 (e.g., dongle) as the wireless communication protocol) over a second host computing device (e.g., using BLE or another standard communication protocol), when the first device is available to connect to. When the first host computing device is not detected or is unavailable, the input device can communicatively connect to the second host computing device. In some implementations, when the input device is connected to the second host computing device, the input device will automatically switch its communicative connection from the second host computing device to the first host computing device as soon as it detects that the first host computing device is available for connection. Aspects of these connectivity hierarchy concepts are presented below, for example, with respect to FIGS. 2-4. It should be understood that although two devices are discussed in many of the embodiments of the present disclosure, the input device can be configured to connect to three or more host computers in any suitable connectivity hierarchy scheme (e.g., automatically selecting a first host computer or wireless connection type over a second host computer or wireless connection type, and selecting the second host computer or wireless connection type over a third host computer or wireless connection type, etc.). One of ordinary skill in the art would understand the many variations, modifications, and alternative embodiments thereof.

Figure 2:
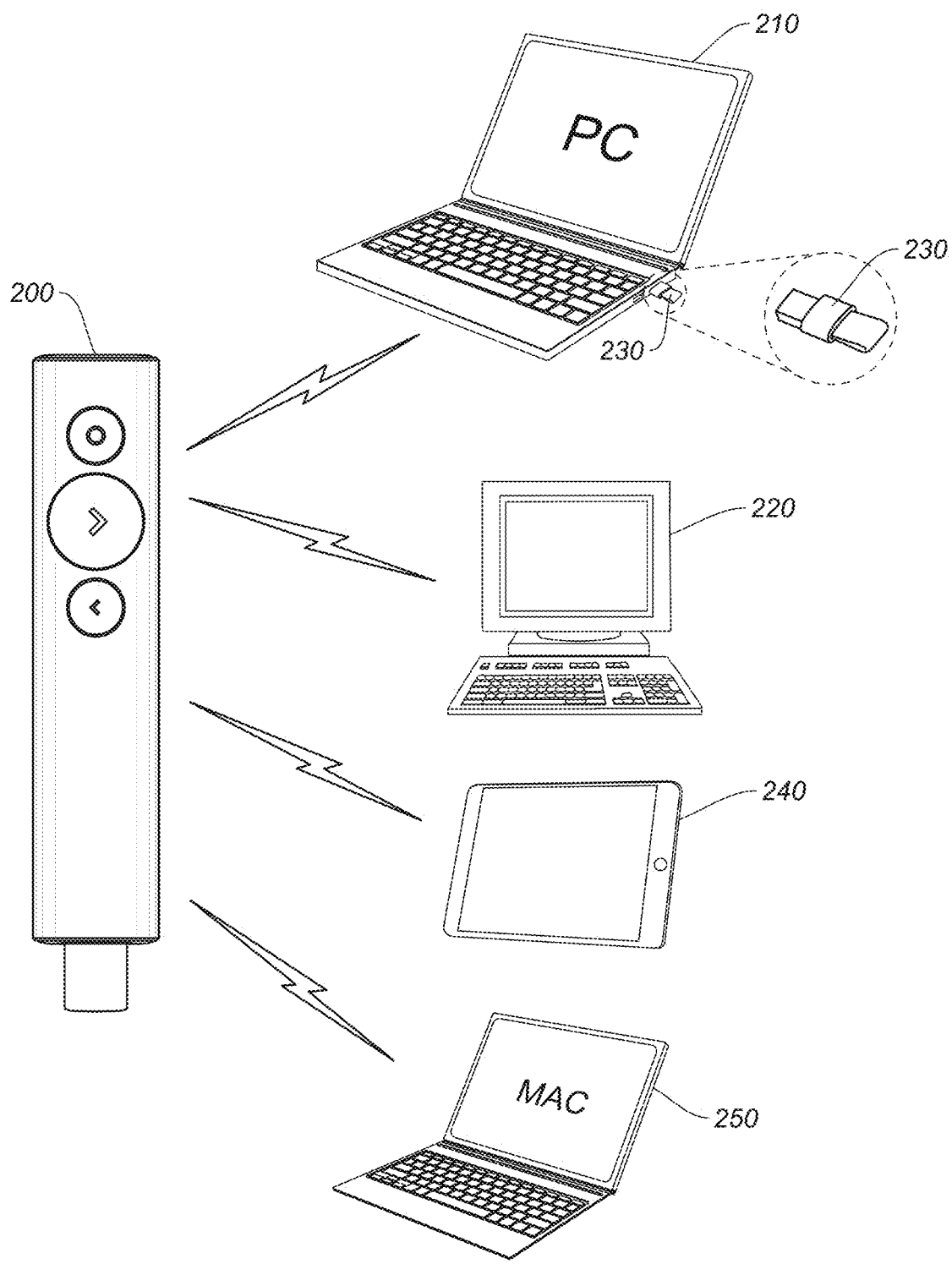
FIG. 2 shows a mobile hand-held input device configured for multi-connectivity with a number of host devices, according to certain embodiments.

FIG. 2 shows a mobile hand-held input device 200 with multi-connectivity capabilities, according to certain embodiments. Input device 200 is capable of being communicatively coupled to any of receiver 230 (coupled to host computer 210) or host computing devices 220, 240, or 250. Receiver 230 can be a wireless transceiver operating at 2.4 GHz or other suitable frequency. Host computing devices 210, 220, 240, and 250 are shown as a PC-based laptop computer, a desktop computer, a tablet computer, and a Mac-based laptop computer, respectively, but can be any suitable computing device that may additionally include a netbook, a smart phone, a smart wearable (e.g., smart watch, glasses), or the like. Host computing devices 210, 220, 240, and 250 may operate any suitable operating system including, but not limited to Windows®, macOS®, Linux®, Android®, iOS®, or the like. Each host device can operate any suitable wireless communication protocol including, but not limited to, Bluetooth®, BLE, ZigBee®, ZWire®, Wi-Fi (IEEE 802.11), Thread, Logi® protocols, or the like, as would be understood by one of ordinary skill in the art. Referring to FIG. 2, host computing device 210 is using a Logi® proprietary 2.4 GHz wireless communication protocol, and host computing devices 220, 240, and 250 are using BLE (operating at 2.4 GHz).

In some embodiments, input device 200 can have two or more wireless communication channels. In the previous example, a single channel can switch between host computing devices and corresponding wireless communication protocols based on a preference hierarchy (further discussed below in FIGS. 3-4). Alternatively or additionally, an additional channel can be used to remain communicatively coupled to one or more additional devices. In such cases, input device functionality (e.g., cursor movement, button control, etc.) can be limited to a single host computing device at a time. One advantage of simultaneous multi-host connectivity is the ability to switch between host computing devices very quickly (e.g., 10 ms or less) because input device 200 does not have to expend any time or resources reestablishing a wireless connection with the target host computing device.

In some implementations, the connection hierarchies described above can be user programmable. For example, a factory default setting may prioritize receiver 230 as the primary choice for establishing a wireless connection, followed by BLE or other suitable wireless communication protocol. A user can choose to switch prioritize BLE over receiver 230, or another communication protocol over both receiver 230 and BLE. One of ordinary skill in the art would understand the many variations, modifications, and alternative embodiments thereof.

Alternatively or additionally, switching between host computers can be initiated by a movement and/or orientation of input device 200. Input device 200 may include one or more accelerometers, gyroscopes, or other suitable inertial measurement unit (IMU)-based system to detect said movement and/or orientation, as shown and described below with respect to FIG. 10. In some embodiments, pointing input device 200 in the direction of a host computing device causes input device 200 to switch to that particular host computing device being pointed at. In such cases, the location of each host computing device can be determined based characteristics of the corresponding wireless communication protocol (e.g., signal strength). In some cases, a user may manually set the location of each host computing device by orienting input device 200 towards a host computing device and associating the orientation data (e.g., the direction that input device 200 is facing) with each particular host computing device. The user can then point input device 200 at the target host computing device and initiate the switch (e.g., in combination with a particular button press). Alternatively, a "flow" type configuration between host computing devices (e.g., switching between two presentations operating on different host computers) can be established as described in U.S. patent application Ser. No. 15/226,770. One of ordinary skill in the art would understand the many variations, modifications, and alternative embodiments thereof.

Figure 3:
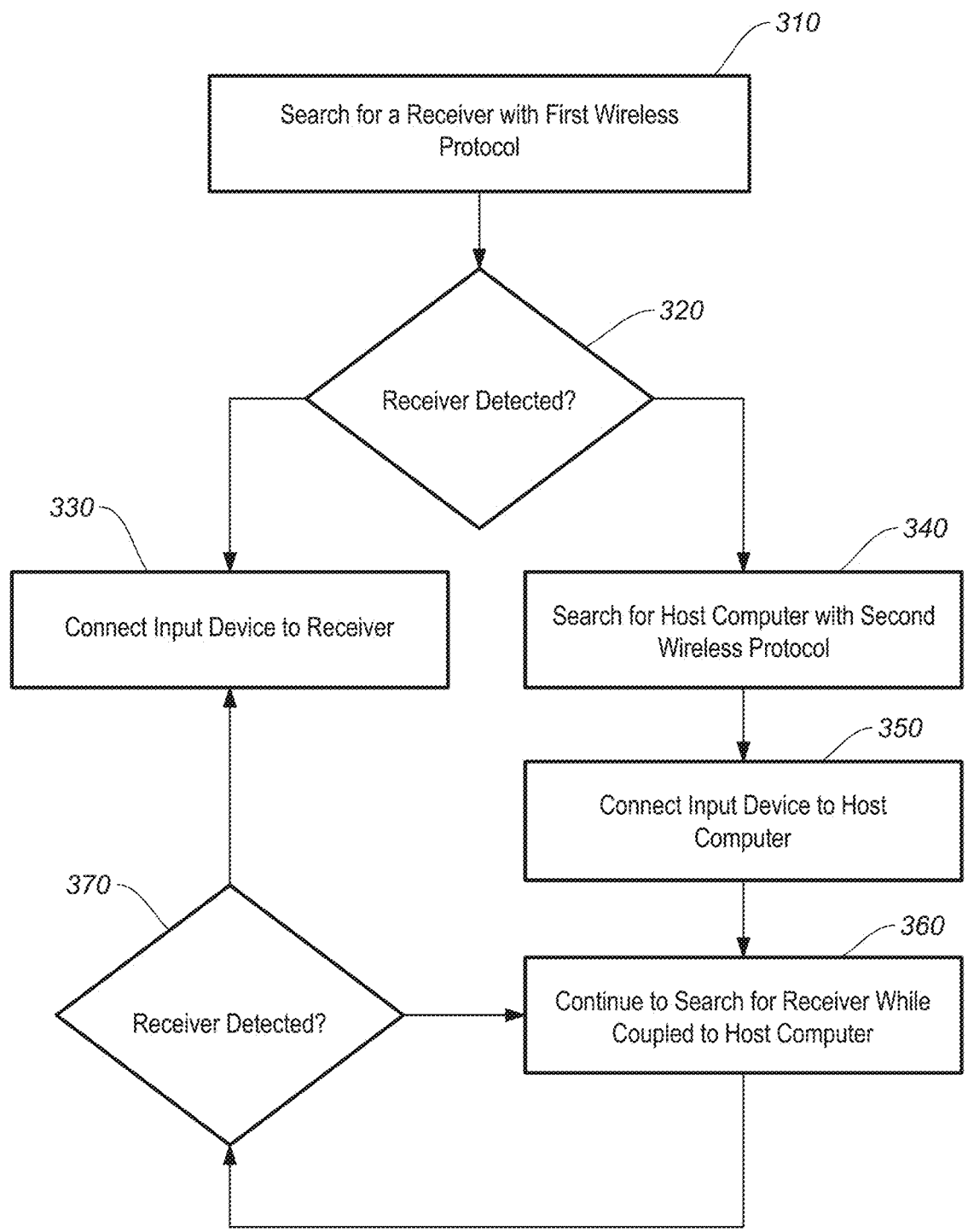
FIG. 3 is a simplified flow chart showing aspects of a method of establishing a wireless connection with a mobile input device, according to certain embodiments.

FIG. 3 is a simplified flow chart showing aspects of a method 300 for establishing a wireless connection with a mobile input device, according to certain embodiments. Method 300 (as well as methods 400, 700, and 1000-1200) can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 300 can be performed by processor 1710 of system 1700, as shown and described below with respect to FIG. 17.

At step 310, method 300 can include searching for receiver 230 having an active and available first wireless communication protocol. Receiver 230 can be coupled to any suitable host computing device including any one of a desktop computer, laptop computer, tablet computer, smart phone, smart wearable, or the like, as further described above. In some embodiments, receiver 230 can be a dongle operating at 2.4 GHz, or other suitable frequency. Step 310 can further include determining whether receiver 230 is available for connection. In some cases, receiver 230 may be paired to a different input device, making receiver 230 unavailable for connection with input device 200.

When receiver 230 is detected (step 320), method 300 can include automatically connecting input device 200 to receiver 230 (step 330). When receiver 230 is not detected (step 320), method 300 can include searching for a host computer having an active and available second wireless communication protocol (step 340). In some cases, input device 200 can continue to continuously or periodically search for receiver 230 (e.g., check for receiver 230 availability every 100 ms, 1 sec, 10 sec, or any suitable amount of time). Alternatively or additionally, input device 200 can search for receiver 230 availability each time a user input is received by input device 200. For example, each time a user presses a button (e.g., top button 122), or a subset thereof (e.g., every 10$^{th}$ user input). In some cases, the first wireless communication protocol can be different than the second wireless communication protocol. The second wireless communication protocol can be any one of Bluetooth®, BLE, ZigBee®, ZWire®, Wi-Fi (IEEE 802.11), Thread, or the like, as would be understood by one of ordinary skill in the art.

At step 350, method 300 can include connecting input device 200 to the host computer having the second wireless communication protocol while receiver 230 is not detected (or available for connection). At step 360, method 300 can include continuing to search for receiver 230 availability while input device 200 is connected to the host computer having the second wireless communication protocol. At step 370, when receiver 230 remains undetected and/or unavailable for connectivity, method 300 can include continuing to search for receiver 230 availability while input device 200 is connected to the host computer having the second wireless communication protocol (step 360). At step 370, when receiver 230 is detected and is available for connection, method 300 can include automatically switching the wireless connection for input device 200 from the host computer having the second wireless communication protocol to receiver 230 (step 330).

It should be appreciated that the specific steps illustrated in FIG. 3 provide a particular method 300 for establishing a wireless connection with a mobile input device, according to certain embodiments. Other sequences of steps may also be performed according to alternative embodiments. For example, alternative embodiments may perform the steps outlined above in a different order. Moreover, the individual steps illustrated in FIG. 3 may include multiple sub-steps that may be performed in various sequences as appropriate to the individual step.

Furthermore, additional steps may be added or removed depending on the particular applications. For example, some implementations can include receiving an input to power-on input device 200, switching an operational mode of input device 200 from a low-power sleep-mode to an active-mode in response to receiving the user input, and switching the operational mode from the active-mode to the low-power-mode in response to determining that (1) the receiver and the second type of wireless communication protocol is not detected, (2) no inputs are received on the mobile input device for a threshold time (e.g., 1 min, 5 min, 30 min, or any suitable time frame), (3) the connection to the receiver is lost and the second type of wireless communication protocol is not detected, or (4) the connection to the second type of wireless communication protocol is lost and the receiver is not detected. In another example, method 300 can further include receiving a user input on the mobile input device when an operational mode of the mobile input device is a low-power sleep mode, where the user input corresponds to one or more human interface device (HID) commands, and in response to receiving the user input when the mobile input device is in the sleep mode, switching the operational mode from the sleep mode to an active-mode, and generating the one or more corresponding HID commands.

In further embodiments, method 300 can include providing a haptic feedback on the mobile input device when the mobile input devices connects with the receiver or the host computer having the second wireless communication protocol. The haptic feedback can be a first type of haptic feedback (e.g., a first pulse pattern and/or frequency) when the mobile input device connects with receiver 230, and the haptic feedback can be a second type of haptic feedback (e.g., e.g., a first pulse pattern and/or frequency) when input device 200 connects with the host computer having the second wireless communication protocol. One of ordinary skill in the art would recognize and appreciate many variations, modifications, and alternatives of method 300.

Figure 4:
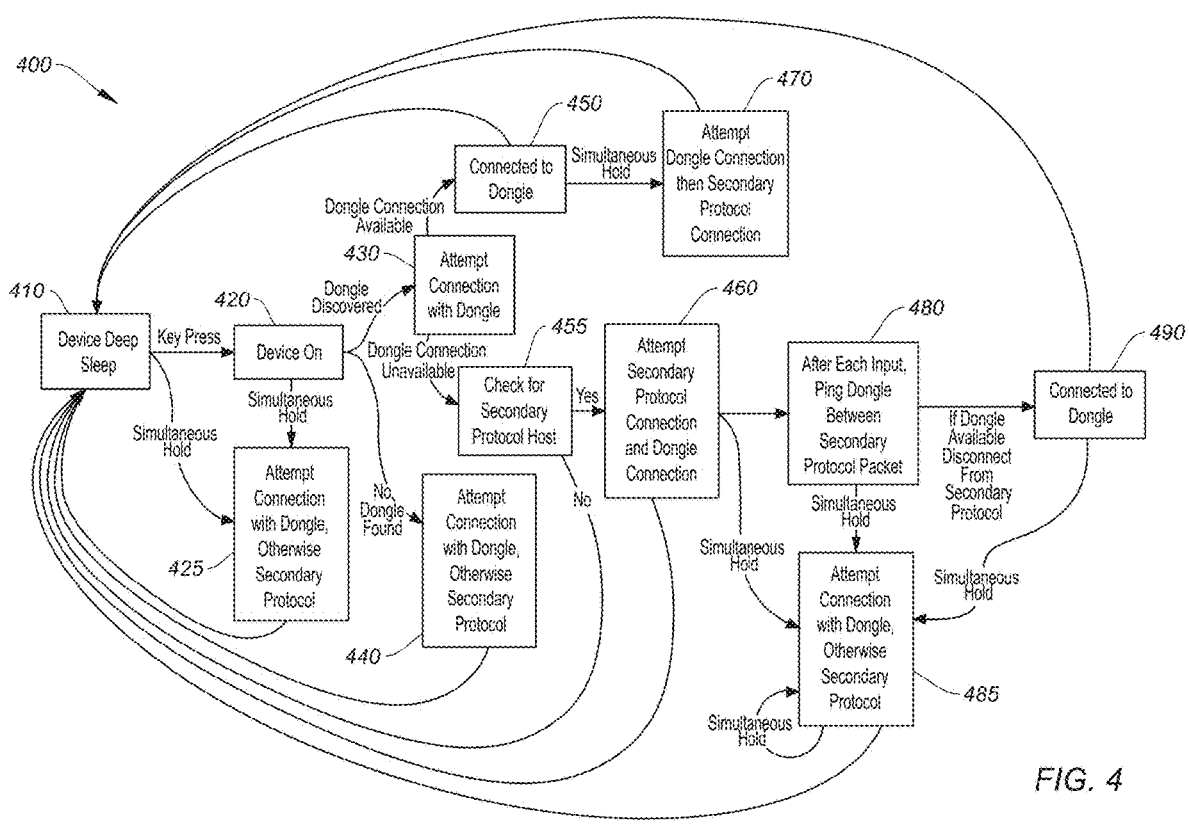
FIG. 4 is a flow chart showing aspects of a method for operating a mobile hand-held input device with power saving features, according to certain embodiments.

FIG. 4 shows a flow chart showing aspects of a method 400 for operating a mobile hand-held input device with power saving features, according to certain embodiments. In some embodiments, method 400 can be performed by processor 1710 of system 1700, as shown and described below with respect to FIG. 17.

At step 410, input device 200 can be in a sleep mode of operation. The sleep mode can be a low power state of operation that uses less power than when input device 200 is in a normal mode of operation. In the sleep mode, one or more modules, functions, circuits, etc., may be shut down or placed in a low power state. At step 420, input device 200 switches to a normal mode of operation (e.g., all modules, functions, and circuits return to normal operating state), or "On Mode" in response to receiving an input signal (e.g., button press, touch sensor input, etc.) on input device 200.

In some embodiments, the user input (e.g., button press) can be saved in a memory buffer and sent to a host computing device after input device 200 establishes a connection. For example, a user input (e.g., button press for a "next slide" function in a slide presentation application) can perform two functions: operate to return input device 200 from a sleep mode to a normal mode of operation, and perform the intended function (e.g., issue a "next slide" command) with a single button click.

At step 425, input device 200 can attempt to communicatively connect to a new receiver 230 (i.e., not previously known or connected to) for a first threshold timeout period, followed by BLE advertising for a second threshold timeout period, in response to either receiving a particular combination of user inputs for a third threshold timeout period (e.g., simultaneously holding two or more buttons for 1 second or more), or when no known receiver is associated with input device 200 (step 440). In this example, BLE is the secondary wireless communication protocol, but any suitable communication protocol can be used (e.g., Bluetooth®, ZigBee®, ZWire®, Wi-Fi (IEEE 802.11), Thread, Logi® protocols, etc.). In some embodiments, the first threshold time can be 1 s and the second threshold time can be 3 min, however other time intervals can be used, as would be understood by one of ordinary skill in the art. Step 425 can be reached from both sleep mode (step 410) and "On Mode" (step 420). When no connection is available from either the new receiver or from BLE for the threshold timeout period (e.g., 3 min), input device 200 can return to sleep mode (step 410).

At step 430, input device 200 attempts to connect (e.g., sends a connection request) to a known pre-paired receiver. If the pre-paired receiver is available, input device 200 establishes a communicative connection with it (step 450). Once connected, if the connection with the receiver is subsequently lost or out of range, attempts at reconnection can occur for a period of time (e.g., 1 s) before returning input device 200 to a sleep mode (step 410). Alternatively or additionally, if no user inputs (e.g., clicks on a button) are received for a period of time (e.g., 30 min), input device 200 can return to a sleep mode (step 410). If a user input is received on input device 200 after losing connection with receiver 230, then input device 200 can be reset in BLE (or other suitable communication protocol) if available.

At step 450, in response to receiving a particular combination of user inputs (e.g., simultaneously holding two or more buttons for 1 second or more), input device 200 can attempt to communicatively connect to a new receiver 230 (i.e., not previously known or connected to) for a first threshold timeout period, followed by BLE advertising for a second threshold timeout period (step 470) When no connection is available from either the new receiver or from BLE for the threshold timeout period (e.g., 3 min), input device 200 can return to sleep mode (step 410).

Referring back to step 430, if a known pre-paired receiver is not currently available, input device 200 searches for a known BLE host computing device (step 455). As discussed above, it should be understood that any suitable wireless communication protocol can be used in place of BLE. Furthermore, references to the pre-paired receiver should be understood to mean that the receiver is coupled to and in electronic communication with a host computing device. At step 455, if no known BLE host computing device is available, input device 200 can go back into sleep mode (step 410). If a known BLE host computing device is available, input device 200 can attempt to connect to it at any suitable time interval while still checking for connection availability with the known pre-paired receiver (step 460). For example, input device 200 can try to connect to the BLE host computing device for 5 seconds followed by an attempted connection to the known pre-paired receiver for 1 second.

At step 460, once connected to the BLE host computing device, if the connection is subsequently lost or out of range, input device 200 can attempt to reconnect for a period of time (e.g., 5 sec) before returning input device 200 to the sleep mode (step 410). Alternatively or additionally, if the BLE host computing device is not reachable for a period of time (e.g., 5 sec), the known pre-paired receiver is not reachable for a period of time (e.g., 1 sec), if the connection to the known pre-paired receiver is lost or out of range, or if no user input is received for a period of time (e.g., 30 min), then input device 200 can return to sleep mode (step 410).

Referring again to step 460, in some embodiments, after each user input on input device 200 (or other interval of user inputs), input device 200 can ping the known pre-paired receiver between sending BLE packets (step 480), as would be understood by one of ordinary skill in the art. When the known pre-paired receiver becomes available, input device 200 can disconnect from the BLE host and connect to the known pre-paired receiver (step 490).

In response to a special user input condition (e.g., simultaneous inputs of two or more buttons on input device 200) from either of steps 460, 480, 485, or 490, input device 200 can attempt to communicatively connect to a new receiver (i.e., not previously known or connected to) for a first threshold timeout period, followed by BLE advertising for a second threshold timeout period (step 485), as similarly described above with respect to step 425. At step 485, if no connection is available for a period of time (e.g., 3 min), then input device 200 can return to sleep mode (step 410). Referring back to step 490, if the connection with the pre-paired receiver becomes lost or out of range, input device 200 can attempt reconnection for a period of time (e.g., 1 sec) or otherwise return to sleep mode (step 410). Alternatively or additionally, if no user input is received for a period of time (e.g., 30 min), then input device 200 can return to sleep mode (step 410).

It should be appreciated that the specific steps illustrated in FIG. 4 provide a particular method 400 for operating mobile hand-held input device 200 with power saving features, according to certain embodiments. Other sequences of steps may also be performed according to alternative embodiments. For example, alternative embodiments may perform the steps outlined above in a different order. Moreover, the individual steps illustrated in FIG. 4 may include multiple sub-steps that may be performed in various sequences as appropriate to the individual step.

Furthermore, additional steps may be added or removed depending on the particular application of method 400. One of ordinary skill in the art would recognize and appreciate many variations, modifications, and alternatives of method 400.

Presentation Enhancements—Do Not Disturb Feature

Some aspects of the invention include a method of operating software to prevent pop-ups, notifications, or other system messaging from appearing on a corresponding display to ensure an uninterrupted user session for an improved presentation experience. The following non-limiting embodiments present various implementations of this concept.

Figure 5:
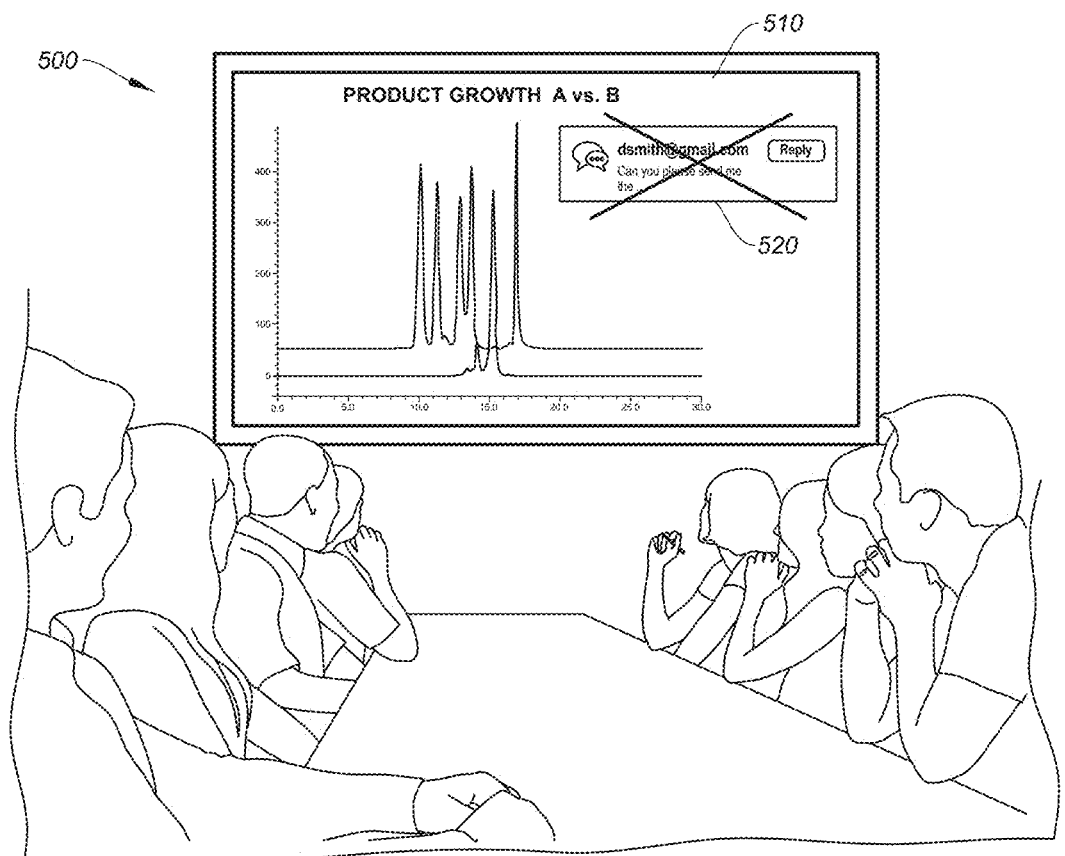
FIG. 5 shows aspects of an uninterruptable display, according to certain embodiments.

FIG. 5 shows aspects of an uninterruptable display 500, according to certain embodiments. Display 500 can be operated by any suitable host computing device (not shown), such as a desktop computer, laptop computer, tablet computer, or the like, as would be understood by one of ordinary skill in the art. In some embodiments, display 500 and the software that operates the uninterruptable operation of the corresponding presentation software can be operated by system 1600 of FIG. 16.

Display 500 shows an uninterruptable image 510 of a slide that can be operated by any suitable presentation software such as PowerPoint®, Keynote®, Prezi®, Google Slides®, or the like. A blocked pop-up notification 520 is shown in FIG. 5, but is not actually visible on display 500. Image 510 can be associated with any displayed image and is not limited to presentation software. For instance, image 510 may be associated with a webpage, word processing software, spreadsheet software, or the like. One of ordinary skill in the art would understand the many variations, modifications, and alternative embodiments thereof.

It can be particularly advantageous to have an uninterruptable display during a live presentation. Interruptions caused by system or application level pop-up messages can distract an audience, detrimentally affect the effectiveness and continuity of a speaker's presentation, or even cause personal information (e.g., personal email notification) to be displayed in a public venue. In some embodiments, an uninterruptable display is achieved by operating software that can capture an image of the display generated by presentation software and placing it on an overlay configured to reside on a top-most display layer that is higher than all other layers, including system-level pop-ups or notifications. The overlay software seamlessly integrates with any system and does not interfere with any operating system (OS) settings, other concurrently running software applications, or other operations, which may differ from one machine to the next. In some embodiments, an image of the presentation software display can be captured and overlaid at 25-30 frames per second (fps) to capture video, GIFs, etc., as further discussed below. In some embodiments, the uninterruptable display feature can be toggled by enabling/disabling a user selectable "do not disturb" feature, as further discussed below.

Figure 6:
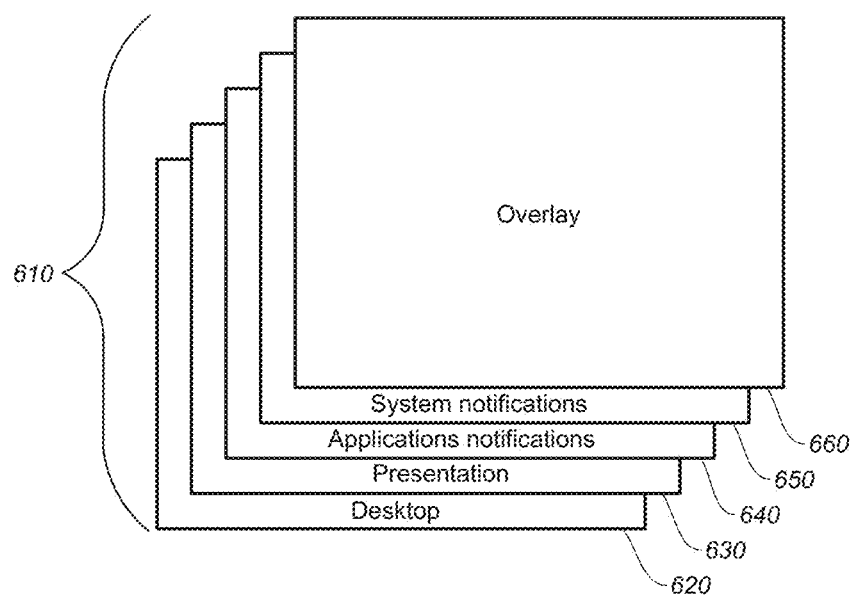
FIG. 6 shows aspects of configuring a hierarchy of displayed windows on a display, according to certain embodiments.

FIG. 6 shows aspects of configuring a hierarchy of displayed windows 610 on a display 600, according to certain embodiments. Windows 610 includes operating system (OS) desktop window 620, presentation window 630, applications notification window 640, system notification window 650, and overlay window 660. In the particular arrangement of FIG. 6, overlay 660 is configured over system notification window 650, applications notification window 640, presentation window 630, and desktop window 620, in that order. Other window hierarchies are possible and some windows may not be present, additional window layers may be added, etc., as would be understood by one of ordinary skill in the art. FIG. 6 can be operated by aspects of system 1600 of FIG. 16.

In certain embodiments, the OS manages the various window layers and orders them on a corresponding display according to a predetermined hierarchy, as discussed above. In some embodiments, transparent overlay window ("overlay") 660 can be positioned at the highest level in the hierarchy. Notifications (e.g., system notification window 650, application notification window 640, etc.) are typically configured at a higher priority than presentation window 630 (or other software application window), to allow for pop-ups and other notifications to be visible, but lower than overlay 660. In some cases, overlay 660 can transmit input events (e.g., keyboard and mouse inputs) to the "focused" presentation application, allowing the user to interface with (e.g., apply user inputs) to any application below overlay 660.

In certain embodiments, the overlay software can perform several functions including highlighting functions (further discussed below), hiding notifications (as mentioned above), and providing additional relevant information (e.g., current battery levels, etc.—as further discussed below). With respect to hiding notifications, the overlay software can set overlay 660 as opaque to hide any underlying notifications. In order to show presentation content (e.g., slides) and hide notifications at the same time, overlay software copies ("grabs" or "captures") the content of the presentation window and displays it on overlay 660. This sharing of content from one window to another can occur at any suitable frequency. In the event that video or rapidly changing images are presented, the frequency should be high enough such that the images appear continuous with no pauses or jittering from a viewer perspective (typically about 25-30 fps).

Capturing display data at high fps rates can utilize considerable processing and image rendering power, which may cause certain processes (e.g., cursor movement) to appear sluggish or discontinuous on certain systems. Similarly, capturing a rapidly moving a cursor and/or performing operations including highlighting, magnifying, etc. (further discussed below) can also tax processing resources and cause visible jitter or delay on overlay 660 on certain systems. In certain embodiments, software operating overlay 660 can detect when a user is performing a particular function that may cause sluggishness (e.g., moving a cursor), cease capturing content from presentation window 630 during that period of time, and continue to display the most recently captured image on overlay 660 during that period of time. After the particular function stops, the 25 fps capture and display process can continue as usual. For faster systems, users may opt to disable this process such that the capture and display process continues regardless of any ongoing cursor movement, highlighting functions, or the like.

Thus, in certain embodiments, when presentation software is launched (e.g., in full screen), application or system notifications can appear on the screen when the "do not disturb" mode is disabled. When the "do not disturb" feature is enabled, the overlay software selects the currently focused presentation window 630, captures its content at a certain frequency (e.g., 25 fps), and display the content on opaque overlay 660.

Figure 7:
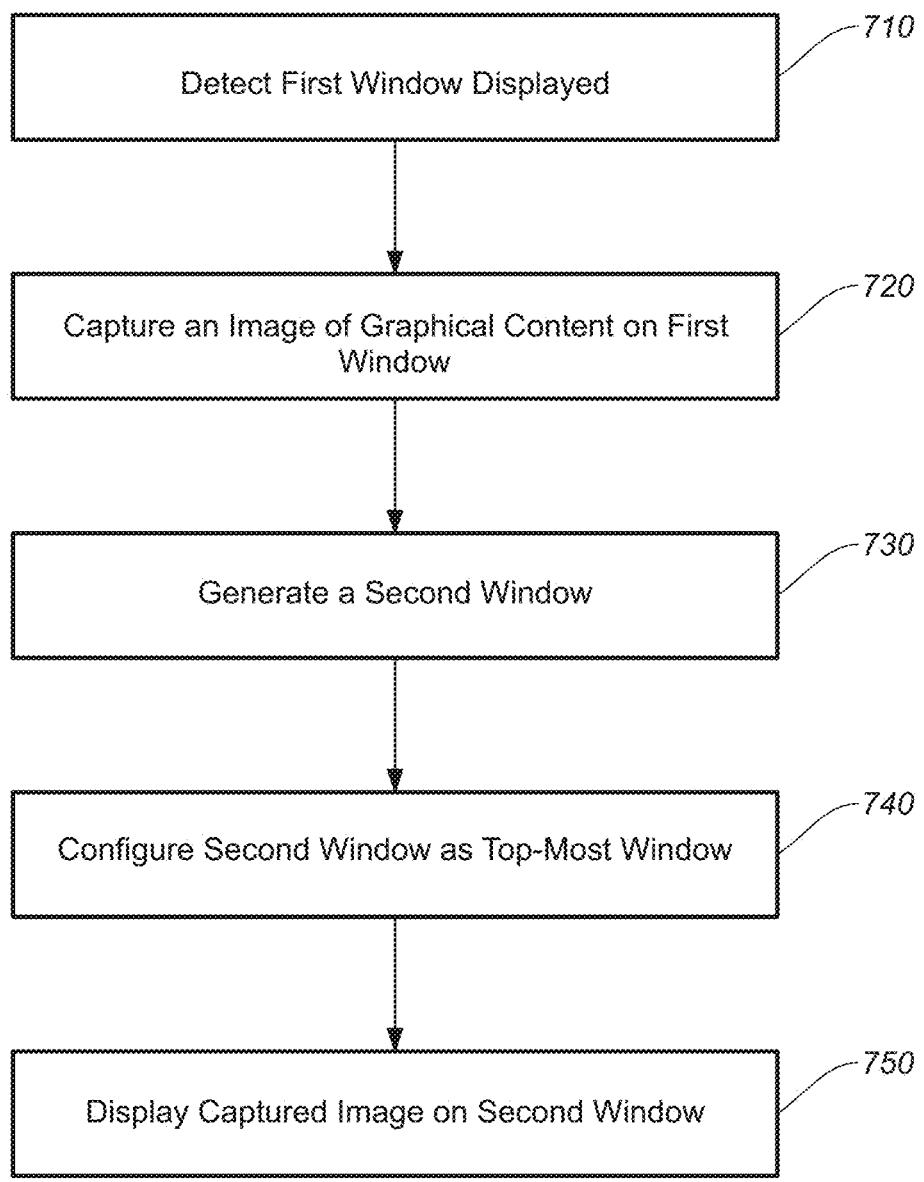
FIG. 7 is a simplified flowchart showing aspects of a method of configuring a hierarchy of displayed windows on a computing device, according to certain embodiments.

FIG. 7 is a simplified flowchart showing aspects of a method of configuring a hierarchy of displayed windows on a computing device, according to certain embodiments. Method 700 can be performed by processor 1602 of system 1600, as shown and described below with respect to FIG. 16.

At step 710, method 700 can include detecting, by a first software application, a first window being displayed on a display of a host computing device. The first software application ("overlay software") can be software that can generate overlay 660 and may be controlled by and/or work in conjunction with input device 200. For example, the overlay software can enable or disable "do not disturb" functionality based on inputs (e.g., cursor movement) from input device 200. The first window can include presentation content from a second software application (e.g., presentation software, such as PowerPoint®, Keynote®, etc.), or other suitable software application, as discussed above.

At step 720, method 700 can include capturing, by the overlay software, an image of the graphical content on the first window. For example, the overlay software can capture (e.g., copy) an image of a slide on the presentation software.

At step 730, method 700 can include generating, by the overlay software, a second window (e.g., overlay 660) on the display of the host computing device. At step 740, method 700 includes configuring overlay 660 as a top-most window on the display, such that subsequent application-level and system-level window pop-ups (or other notification/pop-up windows) occur on a window layer below overlay 660.

At step 750, method 700 can include displaying, by the overlay software, the captured (e.g., copied) image of the graphical content on overlay 660. The capturing (step 720) and displaying (step 740) can occur at any suitable rate. In some embodiments, the rate is typically 25-30 fps. In some cases, overlay 660 can be opaque such that the underlying layers (e.g., windows) are not visible on the display, regardless of the content on overlay 660.

It should be appreciated that the specific steps illustrated in FIG. 7 provide a particular method 700 for configuring a hierarchy of displayed windows on a computing device, according to certain embodiments. Other sequences of steps may also be performed according to alternative embodiments. For example, alternative embodiments may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. For example, in some embodiments, method 700 can include receiving input data from input device 200 (e.g., input data corresponding to a selection of the presentation window to "focus" input data on that particular window), receiving subsequent input data (e.g., button clicks, cursor movement commands, etc.) from input device 200, and applying the subsequent input data to the second application (e.g., presentation software) on the first window when the second window (overlay 660) is displayed as the top-most window on the display. In some cases, the presentation window may already be selected as the "focused" layer, such that any received input data is applied to the presentation application.

In another example, method 700 can include causing, by the overlay software, overlay 660 to be transparent such that the presentation window is visible when input data is received from input device 200, capturing, by the overlay software, an updated image of the graphical content on the presentation window when the input data is no longer received from the input device for a threshold time (e.g., 1 sec), and displaying, by the overlay software, the captured updated image of the graphical content on overlay 660.

Some embodiments may employ highlighting and/or a zoom function to enhance a presentation. For instance, received input data can corresponding to a movement of a cursor on the first window (e.g., presentation window) and method 700 can further include changing an opacity of the transparent second window based on the movement of the cursor. More specifically, the opacity of the transparent second window can be changed in an area around the cursor to highlight a corresponding area of the graphical content on the on the first window, as further discussed below with respect to FIG. 8A. One of ordinary skill in the art would recognize and appreciate many variations, modifications, and alternatives of method 700.

As mentioned above, some embodiments may translate the movement of input device 100/200 to a movement of a cursor on a display, or to a particular function associated with content on a display (e.g., movement controls a volume of a media player, scrolls a document, etc.). The computational translation of a movement in 3D space to movement on a two-dimensional display can be performed by the input device (e.g., by processor 1710), by a host computer coupled to the input device (e.g., processor 1602), by a combination thereof, or by a third party device (e.g., computing device in the cloud), as would be understood by one of ordinary skill in the art.

Highlighting, Zoom, Smart On/Off, Media Control, and No Sleep Functions

Figure 8A:
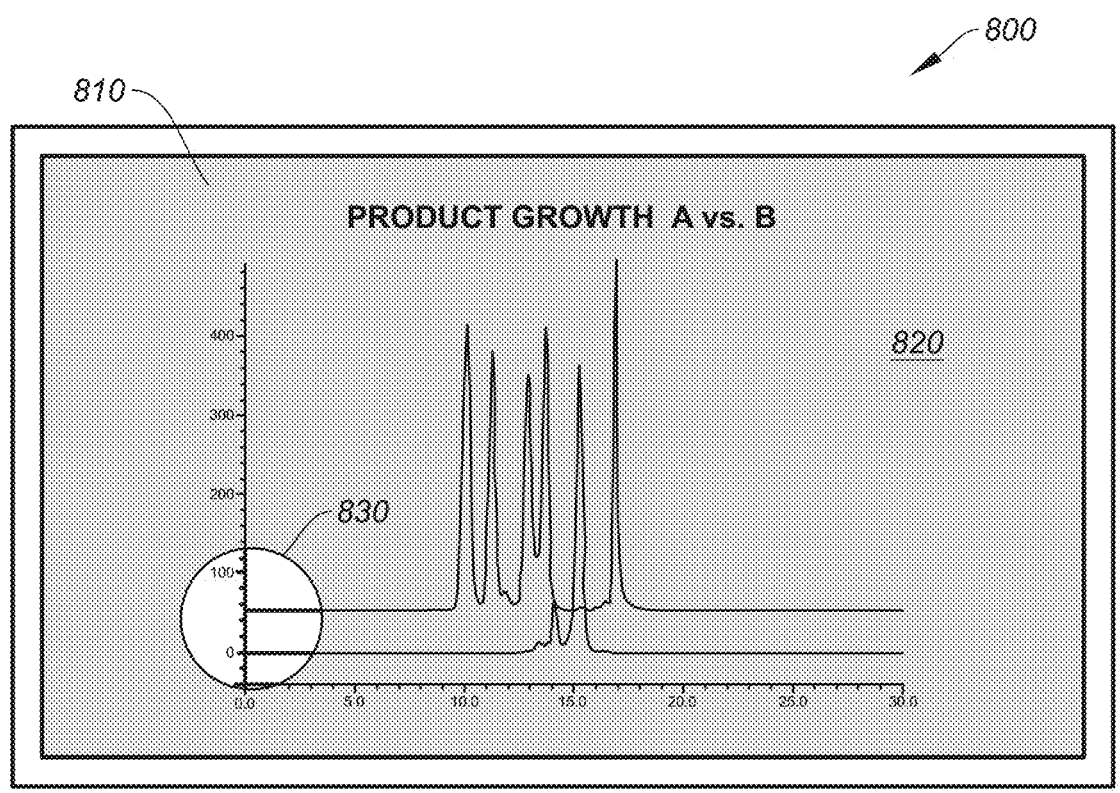
FIG. 8A shows aspects of a highlighting function in a presentation application, according to certain embodiments.

FIG. 8A shows aspects of a highlighting function in a presentation application, according to certain embodiments. An image 810 (e.g., presentation slide) is shown on presentation window 630 on display 800. Display 800 further includes a semi-transparent layer 820 (e.g., overlay 660) configured higher than the presentation window 630, as described above with respect to FIG. 6 (note: overlay 660 is opaque in the embodiment of FIG. 6). The semi-transparent layer can operate to dim the overall image by "graying out" the slide so that a non-"grayed out" area 830 gives the appearance of a highlighting effect. Area 830 movement can correspond to a movement of a cursor controlled by input device 200.

In some embodiments, the highlighting effect occurs over presentation window 630, as described above. One drawback is that pop-ups may still occur in this configuration. Alternatively or additionally, the highlighting function can occur on overlay 660. The overlay software can capture images of presentation window 630 and display them on opaque overlay 660. To create the highlighting effect, the entire overlay can be dimmed except for an area 830 that is not dimmed, which can create a highlighting effect. Such embodiments can still operate under the "do not disturb" setting and maintain the benefit of an uninterruptable presentation. Area 830 can be any suitable shape or size, and may or may not directly track cursor movement, which may be controlled by movement of the input device in 3D space, as discussed above. One of ordinary skill in the art would understand the many variations, modifications, and alternative embodiments thereof.

Figure 8B:
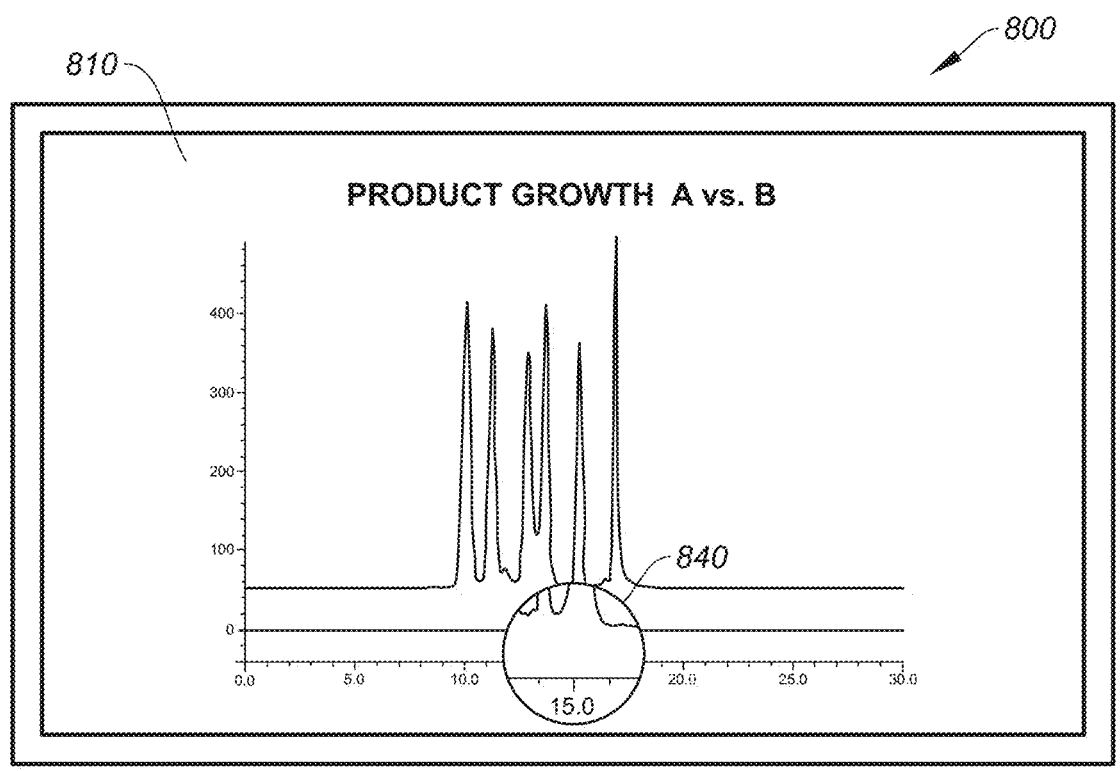
FIG. 8B shows aspects of a zoom function in a presentation application, according to certain embodiments.

FIG. 8B shows aspects of a zoom function in a presentation application, according to certain embodiments. An image 810 (e.g., presentation slide) is shown on presentation window 630 on display 800. Area 840 shows an enlarged or "zoomed" portion of image 810. The movement of area 840 can correspond to a movement of a cursor controlled by input device 200.

In some embodiments, the zooming effect is achieved by capturing and displaying image 810 on overlay 660 and magnifying (e.g., zooming) image 810 by a magnification factor (e.g., 1.5×, 2×, 10×, etc.) over area 840 Area 840 can be any suitable shape or size, and may or may not directly track cursor movement. One of ordinary skill in the art would understand the many variations, modifications, and alternative embodiments thereof.

In certain embodiments, input device 200 can include a smart on/off feature that automatically powers on input device 200 in response to receiving a user input (e.g., button press) and (re)establishes a connection with a host computer (e.g., host computer with receiver 230, BLE host, etc.). In some cases, the user input can be saved (e.g., in a memory buffer) and applied after the wireless connection is established. Thus, a single user input can both power up input device 200 (e.g., in sleep mode) and apply the user input to the focused window (e.g., presentation window 630), which can simplify the connection process thereby allowing a user to simply plug in receiver 230 or press a key to begin presenting without any cumbersome connection processes.

In some embodiments, software installed on a host computer can operate in conjunction with input device 200 to determine the contents on a particular window. More specifically, some embodiments can scan and detect if playable media (e.g., audio or video link, players, etc.) is accessible on a selected ("focused") window, such as a presentation slide. The software can relay this information to input device 200, causing input device to auto-configure input interface 120 (e.g., buttons 122-126) to automatically play the media data without requiring, for example, cursor movement and selection of the media link or media player. Alternatively or additionally, motion of the input device can be mapped to certain functions (e.g., controlling a volume on a media player) in response to detecting certain content on a display. In some cases, multiple mappings can be configured in response to the detection of singular content. For example, detecting a media play may cause one or more buttons to be assigned to media transport controls (e.g., play, pause) and input device movement detection to be assigned to control a volume. These concepts are further discussed below with respect to FIGS. 9A and 9B. In some embodiments, the overlay software of FIG. 6 can be the same software that controls media scanning and detection on selected windows.

In further embodiments, input device 200 can implement a "no sleep" function to prevent a host computer from going into a sleep mode. For example, during a slide presentation, a presenter may stay on a particular slide for an extended period of time, causing the screen to go blank and/or cause the host computing device to enter a low power mode of operation in response to a lack of user inputs for the extended period of time. Input device 200 can keep the host computer "awake" by frequently sending commands to the host computer to prevent the onset of a sleep mode. For example, human interface device (HID) commands can be sent to the corresponding host computer every interval of time (e.g., every 10 sec) during periods of no user input activity. The HID commands can perform any function, but preferably does not interfere with the display to prevent any interruptions during a presentation. One of ordinary skill in the art would understand the many variations, modifications, and alternative embodiments thereof.

Figure 9A:
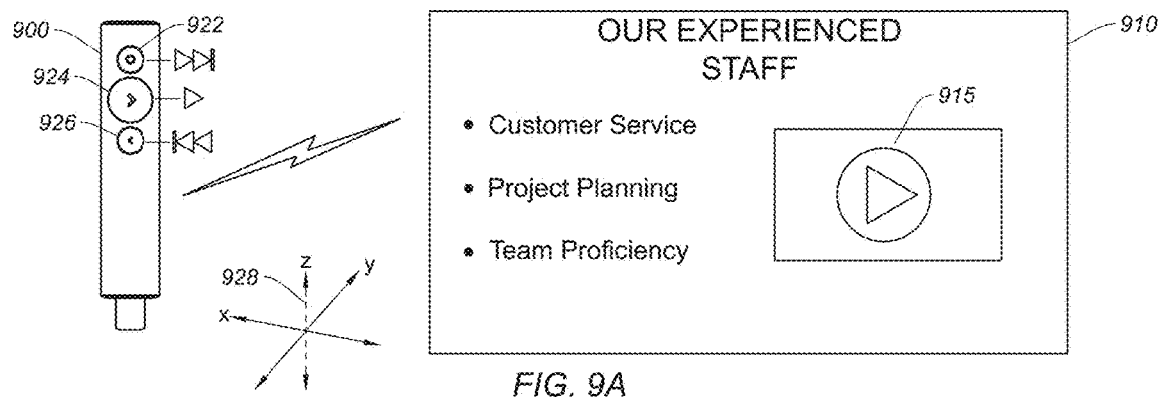
FIG. 9A shows the automatic configuration of an input device based on content of a display, according to certain embodiments.

FIG. 9A shows the automatic configuration of input device 900 based on content of display 910, according to certain embodiments. Display 910 is shown as a presentation slide (e.g., PowerPoint® slide, Keynote® slide, etc.), but can be any suitable image. Display 910 can be operated by any suitable host computing device (e.g., host computing device 210, 220, 240, or 250, system 1600 of FIG. 16, etc.). Display 910 includes an embedded media player 915 and alphanumeric text. Input device 900 includes a top button 922, middle button 924, and bottom button 926. Input device 900 can include any number of input interface controls (e.g., buttons, touch sensitive surfaces, microphones, etc.), similar to input devices 100/200, as further discussed above. Input device 900 can further include one or more IMUs to track movement 928 in 3D space, as further discussed above.

In some embodiments, a host computing device (e.g., processor 1602) can detect one or more graphical control elements on display 910, determine their type, and generate configuration control data to auto-configure one or more input elements (e.g., buttons 922-926, movement 928, etc.) on the input device to control the graphical control element in one or more ways that are typically relevant to the function of the corresponding control element. Referring to FIG. 9A, in response to detecting media player 915, the configuration control data can cause input device 900 to assign, for example, media transport controls to buttons 922-926 (e.g., fast forward, play/pause, rewind, etc.), volume control to the movement of input device 900 (e.g., upwards/downwards movement may control the volume), or combinations of inputs to control the corresponding control element. For example, volume control of media player 915 may be implemented when both a button is pressed (e.g., button 922) and movement data 928 (e.g., movement in a generally up/down direction) is received. One of ordinary skill in the art would understand the many variations, modifications, and alternative embodiments thereof.

Figure 9B:
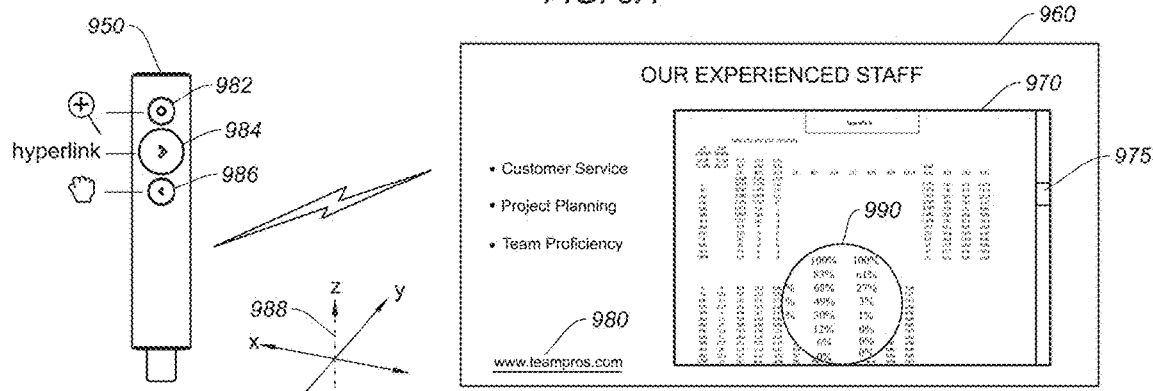
FIG. 9B shows the automatic configuration of an input device based on content of a display, according to certain embodiments.

FIG. 9B shows the automatic configuration of input device 950 based on content of display 960, according to certain embodiments. Display 960 is shown as a presentation slide (e.g., PowerPoint® slide, Keynote® slide, etc.), but can be any suitable image. Display 960 can be operated by any suitable host computing device (e.g., host computing device 210, 220, 240, or 250, system 1600 of FIG. 16, etc.). Display 960 includes an embedded spreadsheet 970, a web-based hyperlink 980, and alphanumeric text. Spreadsheet 970 includes text that extends to multiple pages that are not visible on a single screen that can be accessible by manipulating scroll bar 975. In some cases, the text may be very small and difficult to read. Thus, a magnifying function 990 may be employed, as shown. Input device 950 can include a top button 982, middle button 984, and bottom button 986. Input device 950 can include any number of input interface controls (e.g., buttons, touch sensitive surfaces, microphones, etc.), similar to input devices 100/200/900, as further discussed above. Input device 950 can further include one or more IMUs to track movement 988 in 3D space, as further discussed above.

In some embodiments, a host computing device (e.g., processor 1602) can detect one or more graphical control elements on display 960, determine their type, and generate configuration control data to auto-configure one or more input elements (e.g., buttons 982-986, movement 988, etc.) on the input device to control the graphical control element in one or more ways that are typically relevant to the function of the corresponding control element. Referring to FIG. 9B, in response to detecting spreadsheet 970 and hyperlink 980, the configuration control data can cause input device 900 to assign, for example, a hyperlink button (e.g., middle button 984) to automatically launch hyperlink 980 (e.g., without having to select hyperlink 980 with a cursor), and a "grab" button to automatically grab scroll bar 975 (or other manipulable object), and movement 988 to control scrolling of the text on spreadsheet 970 (e.g., when the "grab" function is also selected), such as scrolling up and scrolling down (or page up and page down) in response to detecting movement of input device 950 in an upward and/or downward direction. In some cases, the host computer may detect that the text in the spreadsheet is at or below a certain font point size (e.g., below 8 pt. font) and assign a magnification function 990 to button 982. In some embodiments, pressing a button multiple times may toggle certain functions. For instance, pressing button 982 may toggle between a magnification function and a highlighting function (as further discussed above with respect to FIGS. 8A and 8B. One of ordinary skill in the art would understand the many variations, modifications, and alternative embodiments thereof.

Figure 10:
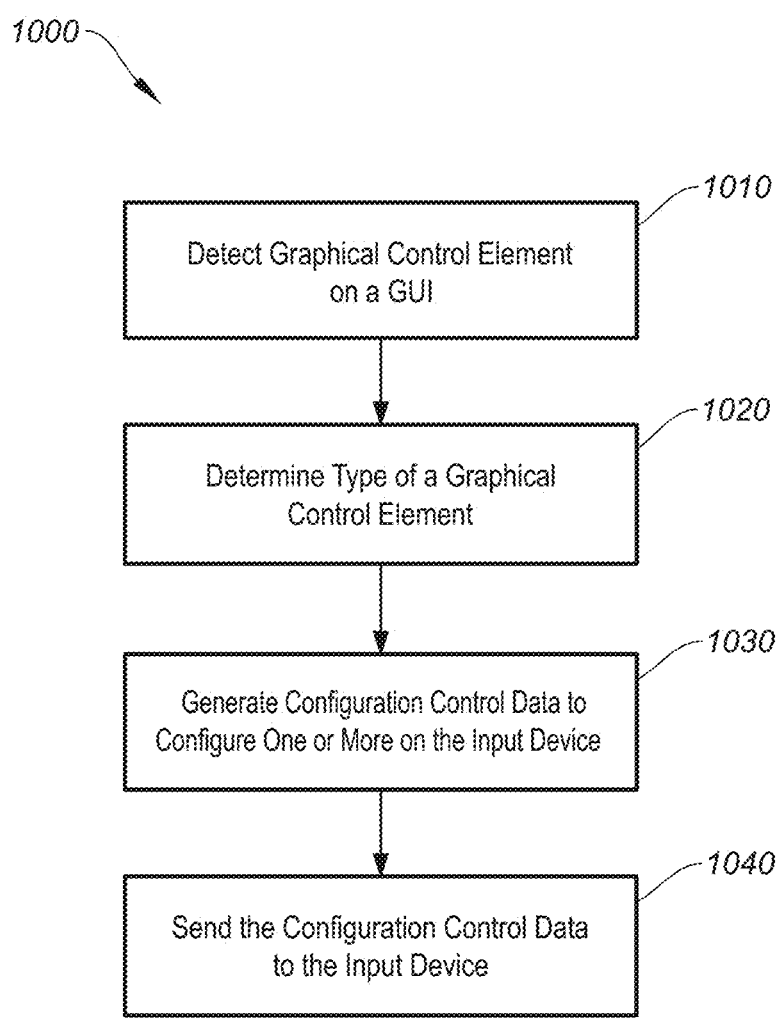
FIG. 10 is a simplified flow chart showing aspects of a method for automatically configuring an input device based on the content of a display, according to certain embodiments.

FIG. 10 is a simplified flow chart showing aspects of a method 1000 for automatically configuring an input device based on the content of a display, according to certain embodiments. Method 1000 can be performed by processor 1602 of system 1600, as shown and described below with respect to FIG. 16.

At step 1010, method 1000 can include detecting, by a processor on a host computing device, a graphical control element on a graphical user interface, according to certain embodiments. A graphical control element can include a media playing device (e.g., video, audio, etc.), a hyperlink, a word processor document, a spreadsheet document, alphanumeric text, or any item on a display (e.g., on a presentation slide), as would be understood by one of ordinary skill in the art.

At step 1020, method 1000 can include determining, by the processor, a type of the graphical control element. As indicated above, the type of control element can be any manipulable object on a display (e.g., media player, hyperlink, spreadsheet, etc.), according to certain embodiments.

At step 1030, method 1000 can include generating, by the processor, configuration control data to cause an input device to configure one or more input elements on the input device to perform functions corresponding to the type of the graphical control element, according to certain embodiments. The one or more input elements can include at least one of a button, touch sensor, motion sensor, or other input element, as would be appreciated by one of ordinary skill in the art. The input device can be one of a presentation device, smart phone, or wearable smart device. In some embodiments, the configuration control data may apply functions corresponding to a video or audio media player that include at least one of media transport control functions or volume control, where the media transport control functions may be associated with one or more buttons on the input device and the volume control may be associated with a movement of the input device. In some cases, functions corresponding to a word processing document, a spreadsheet document, or alphanumeric text may include at least one of magnification or page scrolling, where the magnification control can be associated with both a button and the movement of the input device, and the page scrolling can be associated with the movement of the input device. In some embodiments, the configuration control data can cause the input device to configure at least two of the one or more input elements to perform functions corresponding to the type of the graphical control element, where the at least two of the one or more input elements can be associated with different functions.

At step 1040, method 1000 can include sending, by the processor, the configuration control data to the input device. In some cases, the input device can be separate from and communicatively coupled to the host computing device (e.g., the input device and host computing device may not be one and the same, such as a tablet computer and it's touchscreen).

It should be appreciated that the specific steps illustrated in FIG. 10 provide a particular method 1000 for automatically configuring an input device based on the content of a display, according to certain embodiments. Other sequences of steps may also be performed according to alternative embodiments. For example, alternative embodiments may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. Any of the aspects described above with respect to method 1000 (or methods 300, 400, 700, and 1100-1200) can be applied to any of the input devices, host computing devices, and the like, described in this disclosure. One of ordinary skill in the art would recognize and appreciate many variations, modifications, and alternatives of method 1000.

Figure 11:
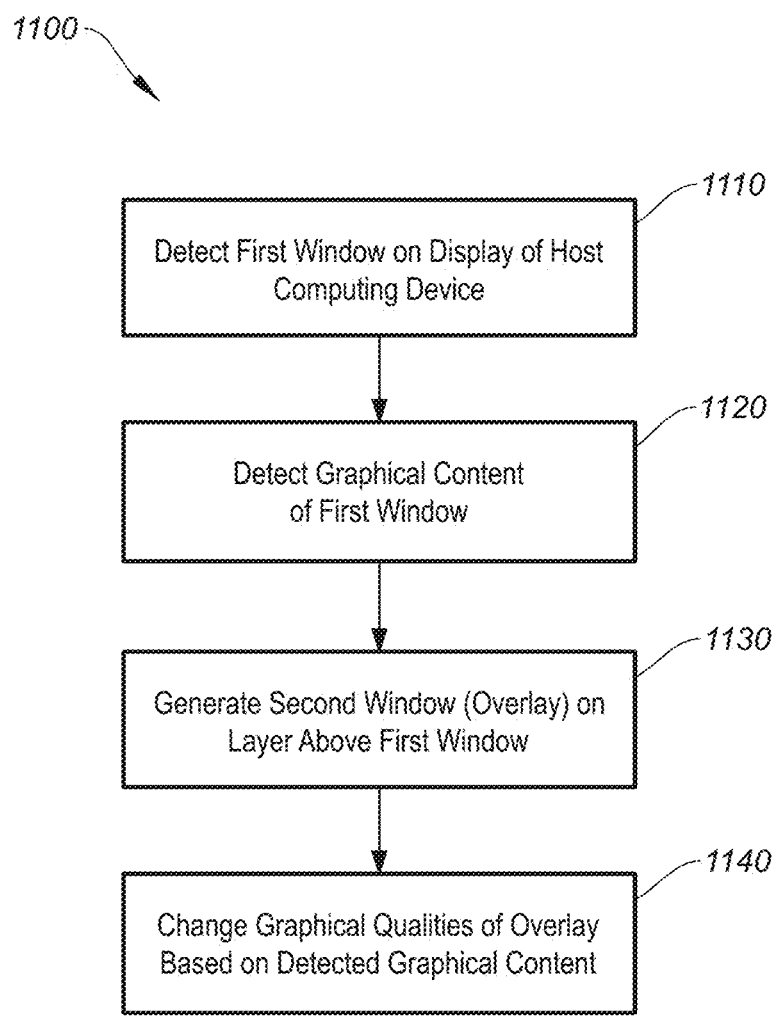
FIG. 11 is a simplified flow chart showing aspects of a method for modifying a highlighting function based on content on a display, according to certain embodiments.

FIG. 11 is a simplified flow chart showing aspects of a method for modifying a highlighting function based on content on a display, according to certain embodiments. Method 1100 can be performed by processor 1602 of system 1600, as shown and described below with respect to FIG. 16. For illustrative purposes, input device 200 and host computing device 1300 are described are referenced in the following description of method 1100. It should be understood that any of the input devices and/or host computing devices described herein can be used, as would be understood by one of ordinary skill in the art.

At step 1110, method 1100 can include detecting a first window 1310 ("slide 1310") on a display 1300 of a host computing device, according to certain embodiments. The detecting can be performed by a first software application ("overlay software") that may be controlled by and/or work in conjunction with input device 200. In the embodiments that follow, the first window can include presentation content from a second software application (e.g., presentation software, such as PowerPoint®, Keynote®, etc.), or other suitable software application (e.g., MS Word®, MS Excel®, etc.), as discussed above.

At step 1120, method 1100 can include detecting graphical content on the first window, according to certain embodiments. The graphical content can include a selectable element, such as an icon, an interactive object (e.g., media player, spreadsheet, scroll bar, etc.), a link (e.g., hyperlink), alphanumeric text, or the like. The detected graphical content can vary widely and is not limited to the examples provided herein, as would be understood by one of ordinary skill in the art.

Graphical content can be detected in several different ways. Consider, for example, presentation software (e.g., PowerPoint®) operating a presentation and displaying a slide with an embedded spreadsheet (e.g., Excel®) in one corner, a media player in another corner, and a hyper link in a third corner (see, e.g., FIG. 15A). One way to detect content is via image processing. This may be advantageous in some instances because there may be no need to access specific software to determine content. Instead, certain objects (e.g., selectable elements) can be determined by examining their shapes and image characteristics. For example, spreadsheets typically have a grid pattern with alphanumeric text configured in a structured and spatially organized and/or symmetrical configuration (e.g., cells, rows, column, etc.). Image processing techniques (e.g., performed in conjunction with processor(s) 1602) can recognize the cells, structures, and patterns typically associated with spreadsheet software, and characterize it as such. Once characterized, the shape and/or color can be determined and the entire element or portion thereof can be recognized and highlighted as described herein.

An embedded media player may have certain common characteristics that can be detected via image processing. For instance, media players tend to have a square or rectangular shaped border, which may be contrasted with its bordering background. Further, media players typically have a "play" button positioned in a center region, and may include a "play" icon (e.g., a sideways triangle) with certain color combinations (e.g., typically red and white). Some media players may include media transport controls in other locations, data displayed on certain locations (e.g., a title, file size, or other data located in a particular location), or other common characteristics typically associated with media players. Image processing techniques can recognize these features and characterize the media player accordingly. Once characterized, the shape and/or color can be determined and the entire element or portion thereof can be recognized and highlighted as described herein.

Hyperlinks (e.g., selectable elements that can cause a web browser to open a particular web page) typically have certain common characteristics. For example, hyperlinks are typically displayed as underlined alphanumeric text, may include a domain names (e.g., ".com, .net, .gov, .edu, etc." country codes, or the like) and may be displayed in a particular color scheme (e.g., blue text). Image processing techniques can recognize these features and characterize the hyperlink accordingly. Once characterized, the shape and/or color can be determined and the hyperlink can be recognized and highlighted as described herein. Image processing can be used to recognize more than simply spreadsheets, media players, and hyperlinks, including certain objects like word processing documents, PDF documents, graphs, tables, .jpgs, .gifs, .mp3 players, .mp4 players, .wav files, and the like. Each type of object typically has common features that are particular to their type of file, which can be recognized by image processing techniques, as described above. One of ordinary skill in the art would understand the many variations, modifications, and alternative embodiments thereof.

Machine learning (e.g., operated by overlay software operating on system 1600) can be used to identify objects, improve object identification, and reduce false positive recognition. For example, certain objects may be determined to be a particular type of element (e.g., media player) when, in fact, they are not. This may be due to the fact that the image processing software (e.g., overlay software) may recognize certain features (e.g., underlined text, cells or rows/columns, etc.) that may simply be background graphics on a slide or document that a user may not want to be individually highlighted. A user can indicate that the identified element is not, in fact, a selectable element in any number of ways including, but not limited to, providing a user input (e.g., pressing a button on input device 200), or indicating that the identified element is not an element using a software interface (e.g., when creating a slide on presentation software). In some cases, false positive element recognition can be automatic. For example, when a falsely identified element is never activated (e.g., no action occurs that can be identified, such as a web page being opened, media begins playing, etc.), or a cursor rarely engages the element, which may indicate that it is not an element (e.g., if a media player is never played, or a hyperlink is never (or rarely) associated with an input (e.g., button click)). As a particular user continues to use the overlay software, various user characteristics, determined elements, and the like, can be modified over time to increase accuracy. One of ordinary skill in the art would understand the many variations, modifications, and alternative embodiments thereof.

In some embodiments, a user can indicate that an element is or is not to be highlighted using, for example, overlay software. For instance, on a particular window (e.g., slide), overlay software may indicate what it determines to be selectable elements that can be highlighted. A user can verify or refute that determination, which can increase positive element identifications.

Alternatively or additionally, some embodiments may access particular software to determine what elements are included in a particular window. For instance, presentation software can be accessed to determine what is included in each particular slide, which is readily available and easily accessible as would be understood by one of ordinary skill in the art. It should be understood that the various methods of identifying elements described with respect to FIG. 11 can be applied to any of the figures, embodiments, systems, or methods, etc., described herein, as would be understood by one of ordinary skill in the art.

Referring back to FIG. 11, at step 1130, method 1100 can include generating a second window (overlay) on a window layer above the first window, as similarly described above with respect to FIGS. 8A-8B. The second layer can be transparent, semi-transparent, opaque, etc., in addition to having any assortment of other features (e.g., color, shape, etc.) A transparent second layer may allow a user to see the underlying window unimpeded. A semi-transparent layer can operate to dim the overall underlying image. To create a highlighting effect, the overlay may include a transparent area (e.g., an area tracking a movement of a cursor) and a semi-transparent area (e.g., the remaining area) to "gray out" the window, except for the transparent area.

At step 1140, method 1100 can include changing the graphical qualities of the overlay based on the detected graphical content, according to certain embodiments. In some cases, the graphical qualities of the overlay may be similar to the highlighting and magnification features in conjunction with input data (e.g., movement data) from an input device, as shown and described above with respect to FIGS. 8A and 9B. In certain implementations, certain graphical content can be highlighted irrespective of input data (e.g., buttons presses, movement data). For instance, a detected object (e.g., selectable element), such as a an embedded spreadsheet in a presentation application, can be highlighted (e.g., see FIG. 13B). Alternatively or additionally, sub-elements can be identified and highlighted, as shown and further discussed below with respect to FIG. 13C.

It should be appreciated that the specific steps illustrated in FIG. 11 provide a particular method 1100 for modifying a highlighting function based on content on a display, according to certain embodiments. Other sequences of steps may also be performed according to alternative embodiments. For example, alternative embodiments may perform the steps outlined above in a different order. Moreover, the individual steps illustrated in FIG. 11 may include multiple sub-steps that may be performed in various sequences as appropriate to the individual step.

Furthermore, additional steps may be added or removed depending on the particular applications. For instance, some embodiments may include the additional steps of (i) receiving input data corresponding to a movement of a cursor on the first window, (ii) setting a transparency of an area around the cursor to a first transparency, and (iii) and setting a transparency of a remainder of the overlay to a second transparency, such that the area around the cursor appears to highlight a corresponding area of the graphical content on the first window. This is shown, for example, in FIG. 13A.

In some embodiments, method 1100 may further include (i) detecting a selectable element in the graphical content, (ii) determining a shape of the selectable element, (iii) setting a transparency of an area around the selectable element to a first transparency, and (iv) setting a transparency of a remainder of the overlay to a second transparency, such that the area around the selectable element appears to be highlighted. For example, the selectable element can be spreadsheet embedded on presentation software (see, e.g., FIG. 13B). In this case, the shape can be determined (e.g., a spreadsheet can be of a rectangular shape of a particular size), and the graphical qualities of the overlay can be configured such that the overlay is transparent over the selectable element, and darkened (e.g., "grayed out") over the remainder of the overlay or portions thereof. One of ordinary skill in the art would understand the many variations, modifications, and alternative embodiments thereof.

In some embodiments, method 1100 can further include (i) detecting a second selectable element in the graphical content, (ii) receiving input data corresponding to a movement of a cursor on the first window, and (iii) selecting one of the first selectable element or the second selectable element based on the movement of the cursor, wherein the setting the transparency is applied to the selected first or second selectable element. For example, both a spreadsheet (selectable element) and a media player (second selectable element) may be detected on a window (see, e.g., FIG. 14A). Based on a movement of a cursor (e.g., how close the cursor is to each selectable element, and/or a button press on the input device, which quadrant the cursor is located, etc.), one of the selectable element or second selectable element may be highlighted, as shown and described below with respect to FIGS. 14A and 14B.

In further embodiments, method 1100 may include the detection of sub-elements within a selectable element, as shown and described below with respect to FIG. 13C. For instance, method 1100 can further include the steps of (i) detecting a selectable element (e.g., image of input device 1390) in the graphical content, (ii) detecting a sub-element contained within in the selectable element (e.g., button 1392), (iii) determining a shape of the sub-element, (iv) setting a transparency of an area around the sub-element on the overlay to a first transparency (e.g., transparent), and (v) setting a transparency of a remainder of the overlay to a second transparency (e.g., darkened, textured, "grayed out" or the like), such that the area over the sub-element appears to be highlighted. In some cases, a user can switch highlighting from a selectable element to one or more corresponding sub-elements based on received input data from the input device. For instance, successive buttons presses may cycle between a selectable element and a sub-element. Likewise, successive buttons presses (or other suitable input) can trigger cycling between sub-elements of a selectable element. In some implementations, method 1100 can further include (i) detecting a second sub-element of the selectable element, (ii) receiving input data corresponding to a movement of a cursor on the first window, and (iii) selecting one of the first sub-element or second sub-elements based on the movement of the cursor, where the setting the transparency is applied to the selected first or second sub-element. Alternatively or additionally, method 1100 may include switching between the first sub-element or second sub-elements based on the input data from the input device, where the setting the transparency is applied to the selected first or second sub-element. Thus, certain embodiments may switch between selectable elements in response to receiving movement data from an input device, and switch between sub-elements within a selectable element in response to receiving non-movement data including button presses, touch sensor presses, or other suitable input type, as would be understood by one of ordinary skill in the art. Any of the aspects described above with respect to method 1100 can be applied to any of the input devices, host computing devices, and the like, described in this disclosure. One of ordinary skill in the art would recognize and appreciate many variations, modifications, and alternatives of method 1100.

Figure 12:
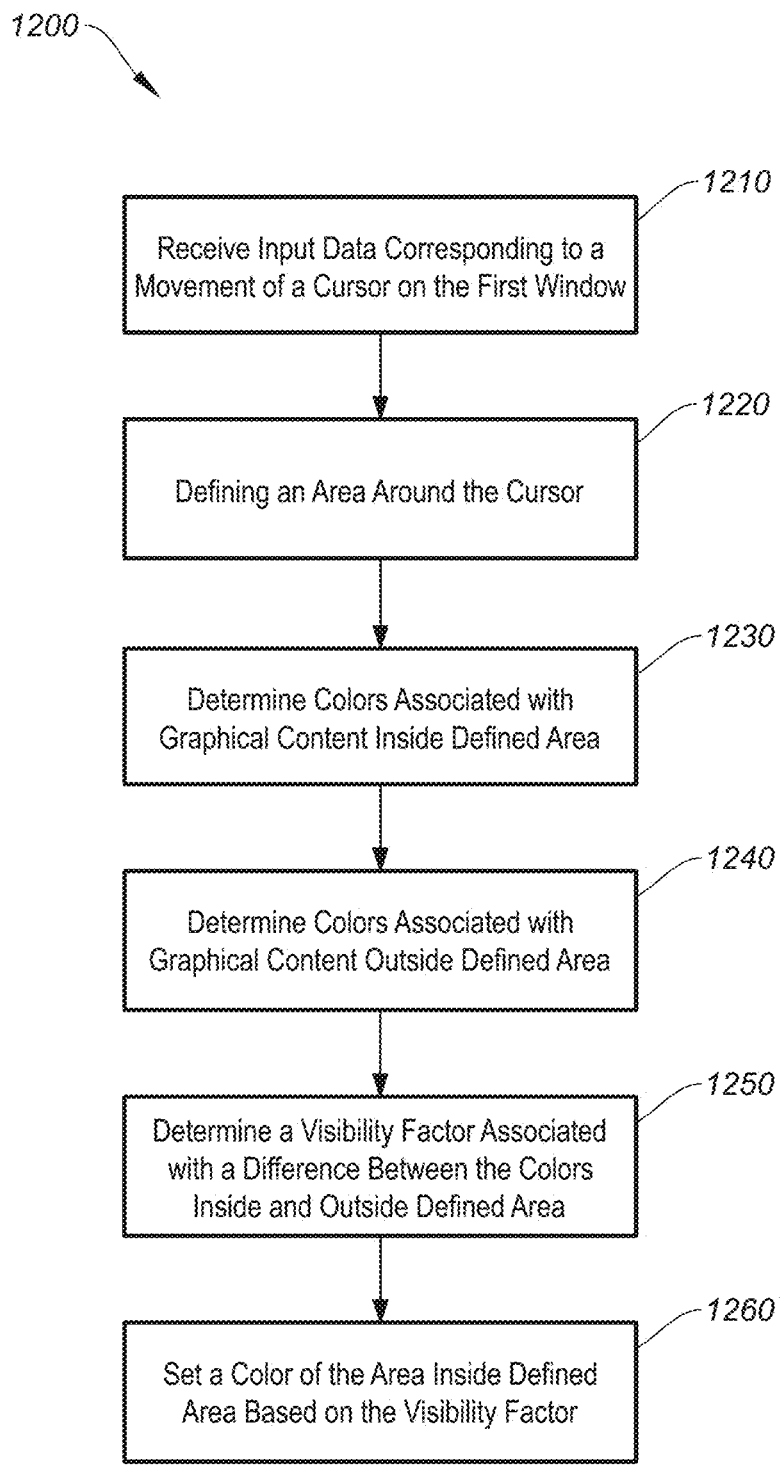
FIG. 12 is a simplified flow chart showing aspects of a method for modifying a color of a highlighting function based on content on a display, according to certain embodiments.

FIG. 12 is a simplified flow chart showing aspects of a method 1200 for modifying a color of a highlighting function based on content on a display, according to certain embodiments. Method 1200 can be performed by processor 1602 of system 1600, as shown and described below with respect to FIG. 16. For illustrative purposes, input device 200 and host computing device 210 are described are referenced in the following description of method 1200. It should be understood that any of the input devices and/or host computing devices described herein can be used, as would be understood by one of ordinary skill in the art.

In some embodiments, the highlighting feature described herein may be difficult to see or appear "washed out" when applied to windows (e.g., presentation slides) having certain color schemes. For example, if a presentation slide had various images having a number of gray-scale shades, then applying an overlay with a gray tone may obscure the underlying graphical content to the point where it may be no longer visible. By examining the color content of a slide, and more particularly the color content inside and out of the highlighted area, an improved highlighting color scheme can be employed to ensure that little to no underlying graphical content is obscured during when performing a highlighting function.

At step 1210, method 1200 can include receiving input data corresponding to a movement of a cursor on the first window, according to certain embodiments. For example, the input data can be input device 200, a computer mouse, trackball controller, or the like, as would be understood by one of ordinary skill in the art.

At step 1220, method 1200 can include defining an area around the cursor. For example, an area around a cursor may be a circle with a predetermined radius (e.g., 1 inch or other unit of measurement, e.g., tied to monitor dots-per-inch (dpi)), as shown below in FIG. 13A. The area can be of any size or shape, as would be understood by one of ordinary skill in the art. In some cases, the area may be fixed, user-programmable, or dynamic such that it can change shape (e.g., change radius) based on a size of corresponding graphical content. For example, if most of the graphical content includes relatively small selectable elements, then the defined area around the cursor may be small. Similarly, if the graphical content tends to be large, then a large defined area may be used. One of ordinary skill in the art would understand the many variations, modifications, and alternative embodiments thereof.

At step 1230, method 1200 can include determining one or more colors associated with the graphical content inside the defined area around the cursor, according to certain embodiments. For example, a dominant color may be detected (e.g., color most prevalent in defined area), some or all colors in the defined area may be detected, an aggregate color may be detected, or other suitable method as would be understood by one of ordinary skill in the art.

At step 1240, method 1200 can include determining one or more colors associated with the graphical content outside the defined area around the cursor, according to certain embodiments. For example, a dominant color may be detected (e.g., color most prevalent outside the defined area), some or all colors outside the defined area may be detected, an aggregate color may be detected, or other suitable method as would be understood by one of ordinary skill in the art. In some embodiments, one or more colors may be detected outside the defined area, but within a certain distance, dpi, or other unit of measurement, from the defined area, as would be understood by one of ordinary skill in the art.

At step 1250, method 1200 can include determining a visibility factor associated with a difference between the one or more colors associated with the graphical content inside the defined area around the cursor with the one or more colors associated with the graphical content outside the defined area around the cursor, according to certain embodiments. In other words, at step 1250, method 1200 can determine if, for example, a default color set (e.g., gray overlay) will "wash out" or obscure any underlying graphical content on the first window. The visibility factor can be a score or determined value (e.g., 0-10 with high visibility at the top end of the scale) based on contrasting color characteristics of the overlay when applying the highlighting effect and the color of the underlying graphical content. Any suitable scoring method can be used, as would be understood by one of ordinary skill in the art. Alternatively or additionally, a brightness can be adjusted to ensure good contrast for improving the visibility of the graphical content.

At step 1260, method 1200 can include setting a color of the area inside the defined area around the cursor based on the determined visibility factor. In the example above where graphical content on the first window includes predominantly gray features, the overlay may utilize a gray background of a different brightness or a different color to mute or darken the area outside the defined area, but not obscure the graphical content.

It should be appreciated that the specific steps illustrated in FIG. 12 provide a particular method 1200 for modifying a color of a highlighting function based on content on a display, according to certain embodiments. Other sequences of steps may also be performed according to alternative embodiments. For example, alternative embodiments may perform the steps outlined above in a different order. Moreover, the individual steps illustrated in FIG. 12 may include multiple sub-steps that may be performed in various sequences as appropriate to the individual step. Some embodiments may use more or fewer steps. For example, in some embodiments, method 1200 may have fewer steps including (i) determining a color associated with the graphical content on the first window, (ii) determining a contrasting color based on the determined color, and (iii) setting a color of at least a portion of the area around the cursor to the determined contrasting color. One of ordinary skill in the art would understand the many variations, modifications, and alternative embodiments thereof. Any of the aspects described above with respect to method 1200 (or methods 300, 400, 700, 1000 and 1100) can be applied to any of the input devices, host computing devices, and the like, described in this disclosure. One of ordinary skill in the art would recognize and appreciate many variations, modifications, and alternatives of method 1200.

Figure 13A:
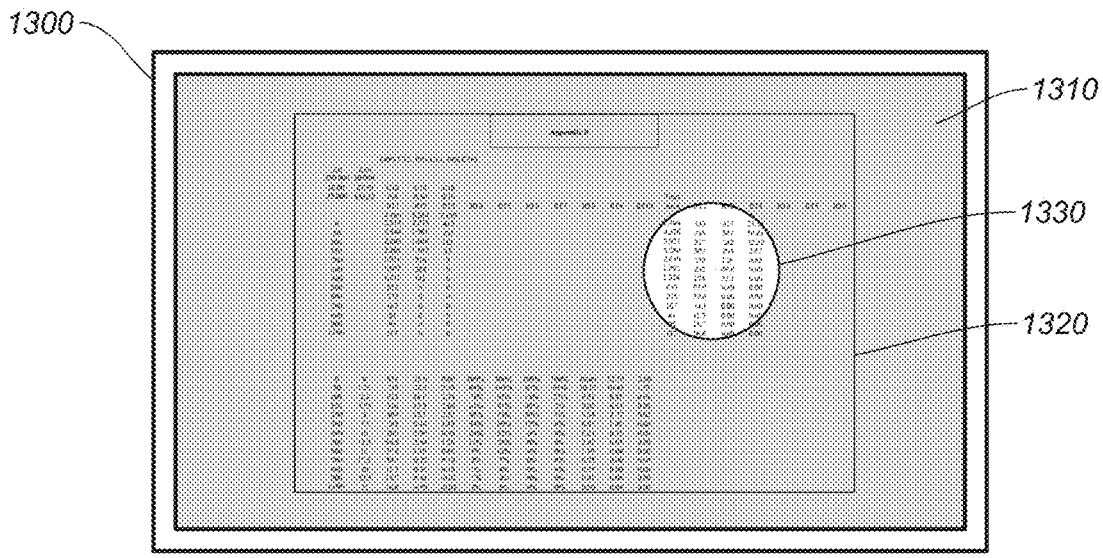
FIG. 13A shows aspects of a highlighting function in a presentation application, according to certain embodiments.

FIG. 13A shows aspects of a highlighting function in a presentation application, according to certain embodiments. A presentation slide 1310 is shown on display 1300 with spreadsheet 1320 embedded on slide 1310, and a highlighted area 1330 that highlights a portion of spreadsheet 1320. Highlighted area 1330 can be interchangeably referred to as a "spotlight." Highlighted area 1330 is shown a circle having a certain area, however any suitable shape or size of highlighted area 1330 can be used. Highlighted area 1330 can be generated by identifying an element (e.g., using image processing or accessing software, as described above with respect to FIG. 11) and setting a transparency of an overlay. In some cases, highlighted area 1330 can be controlled based on a movement of a cursor. For example, moving a cursor over slide 1310 in highlighting mode causes a corresponding movement in highlighted area 1330. In some embodiments, the cursor may be invisible when a highlighting function is selected (e.g., a button press on input device 200), leaving only the highlighted area to prevent obscuring any underlying graphical content. In some cases, the cursor may be visible. One of ordinary skill in the art would understand the many variations, modifications, and alternative embodiments thereof.

Figure 13B:
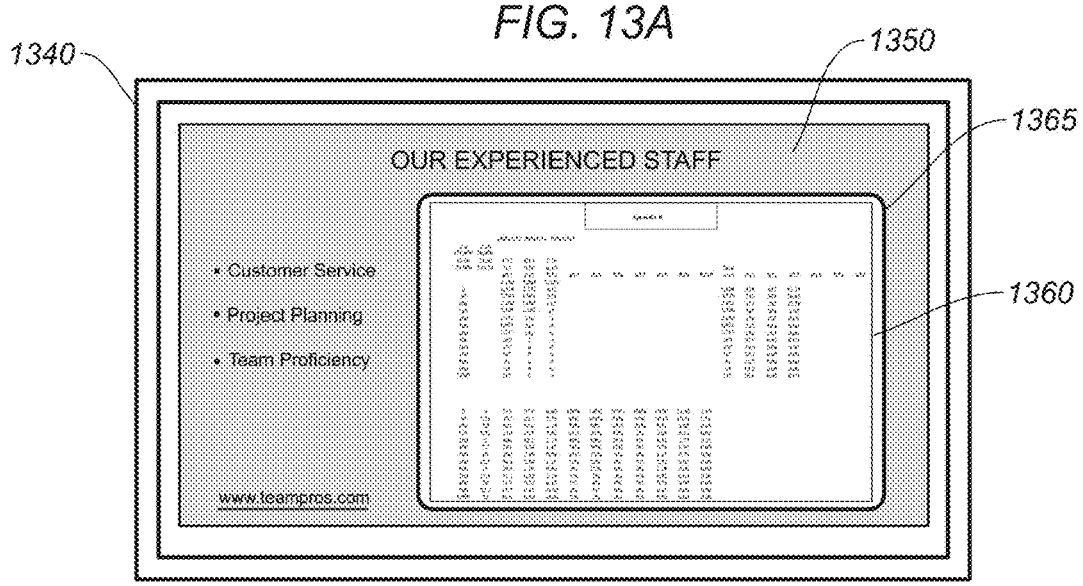
FIG. 13B shows aspects of detecting and highlighting a selectable element on a display, according to certain embodiments.

FIG. 13B shows aspects of detecting and highlighting a selectable element on a display, according to certain embodiments. In some embodiments, objects (e.g., selectable elements) can be highlighted instead of an area around a cursor. That is, instead of highlighting an area around a cursor and manually moving the cursor to a designated location, which may or may not fully highlight a particular object (e.g., spreadsheet), the entire selectable element or portion thereof can be highlighted, which may or may not be directly tied to cursor movement. Referring to FIG. 13B, the selectable element (e.g., spreadsheet) is highlighted (e.g., the overlay is transparent over an area identified as selectable element 1360) and the remainder of slide 1350 is darkened to create the contrasting (highlighting) effect. Although a single element is shown to be highlighted, multiple elements can be highlighted, according to certain embodiments. For example, a class of element (e.g., spreadsheets, .jpgs, hyperlinks, etc.) may all be highlighted (or a subset thereof) when one of the elements of the same class are highlighted. One of ordinary skill in the art would understand the many variations, modifications, and alternative embodiments thereof.

Figure 13C:
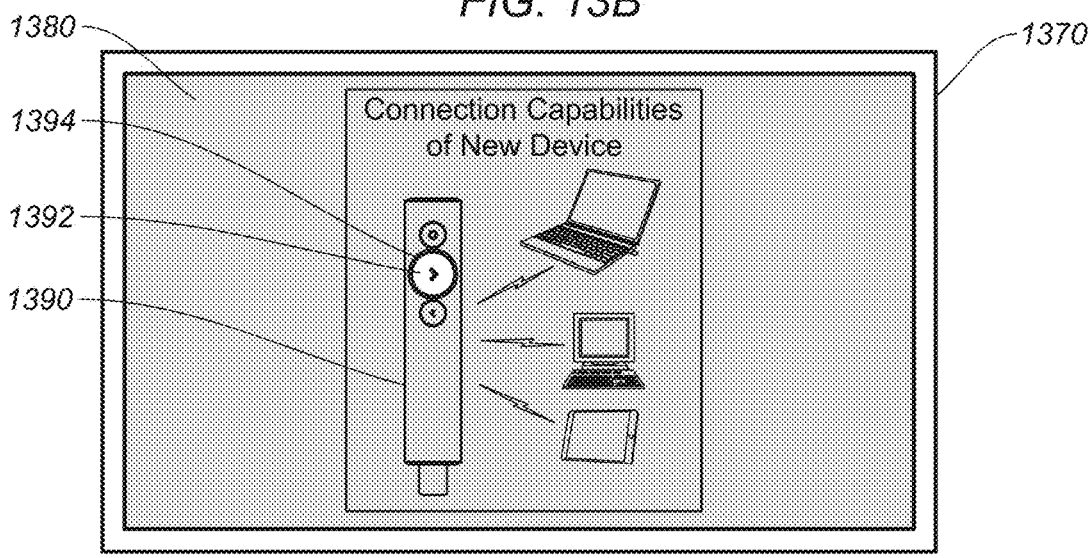
FIG. 13C shows aspects of detecting and highlighting a selectable element on a display, according to certain embodiments.

FIG. 13C shows aspects of detecting and highlighting a sub-element on a display, according to certain embodiments. Display 1370 displays slide 1340, which includes an image of an input device (e.g., input device 200) and various host computing devices. Image processing software, as described above, can recognize element 1390 (e.g., input device 200) as a discrete element that can be highlighted. Additionally, the image processing software can recognize shapes and features within a detected element (i.e., sub-elements) for highlighting. Referring to FIG. 13C, element 1390 includes several buttons (e.g., circles) including button 1392, which is highlighted 1394 using an overlay as further described above. In some cases, multiple sub-element can be highlighted based on class or other metric, as further discussed above. In some implementations, a user may switch between selectable elements or sub-elements by providing an input on an input device (e.g., button press or movement of input device 200), as further discussed below with respect to FIG. 14.

In certain embodiments, the size of a spotlight (e.g., highlighted area 1330) can be changed based on different criteria. For example, in some cases where a graphical element (e.g., block of text, image, etc.) is relatively large, a size (e.g., radius, area, etc.) of the spotlight may increase when a cursor hovers it. Similarly, if the graphical element is small, the spotlight size may decrease accordingly. In some embodiments, a size of the spotlight may change due, at least in part, to a motion of the input device. For example, pressing and holding button 122 may cause a spotlight to appear (e.g., highlight 1330) and movement of input device 100 may change the size of the spotlight. For instance, moving upwards may cause the radius of the spotlight to increase, and moving downwards may cause the radius of the spotlight to decrease. In another example, pressing and holding a button (e.g., button 122) and detecting a rotation of input device 100 clockwise (e.g., via one or more gyroscopes, accelerometers, as described with respect to movement tracking system block 1730 of FIG. 17) may cause the radius of the spotlight to increase, while counter clockwise rotation may cause the radius to decrease. One of ordinary skill in the art would understand the many variations, modifications, and alternative embodiments.

Figure 14:
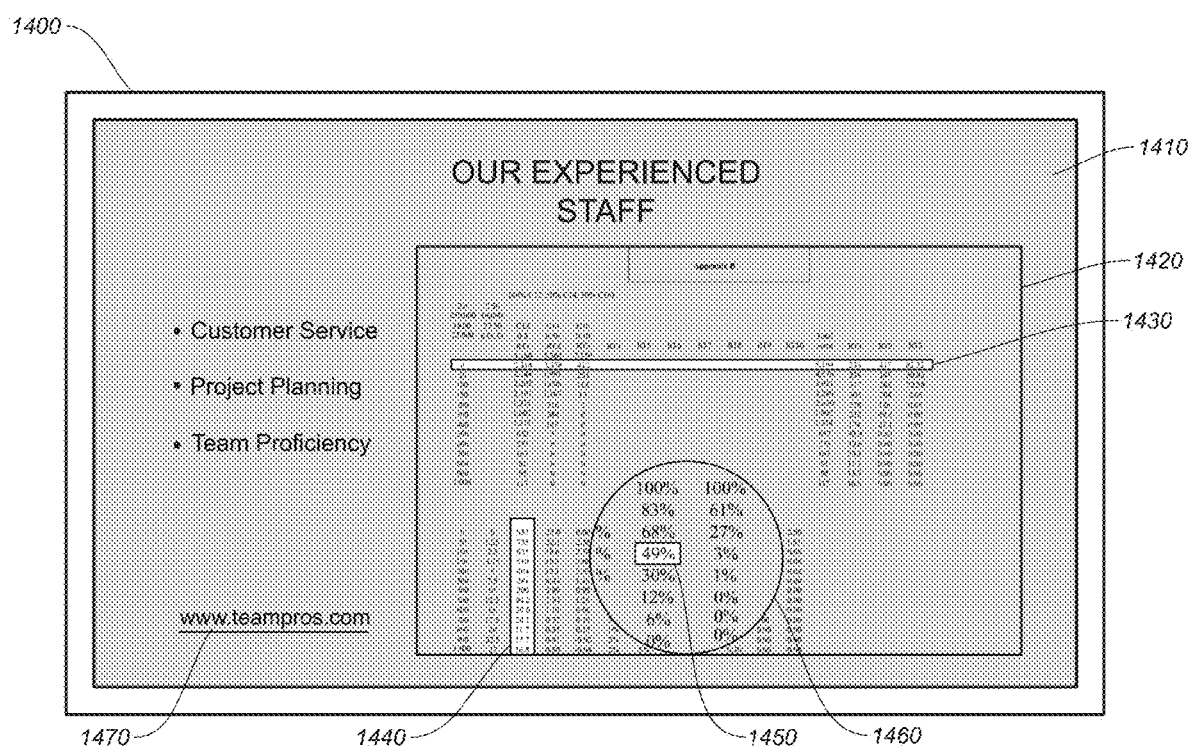
FIG. 14 shows aspects of detecting and highlighting sub-elements on a display, according to certain embodiments.

FIG. 14 shows aspects of detecting and highlighting sub-elements on a display, according to certain embodiments. Display 1400 can include a presentation slide 1410 with spreadsheet (i.e., selectable element 1420), various text, and hyperlink 1470. The spreadsheet includes multiple sub-elements including rows, columns, and cells. Row 1430, column 1440, and cell 1450 are shown as highlighted, and cell 1450 is further magnified 1460. Selectable element 1420 and its sub-elements can be identified via image processing or user-identification, as described above with respect to FIG. 11. Although multiple elements are shown as highlighted in FIG. 14, it should be understood that, in this particular example, they are discussed and treated as though they are individually highlighted (e.g., no other elements or sub-elements are highlighted) to simplify explanation, however some embodiments may employ multiple-element highlighting schemes. One of ordinary skill in the art would understand the many variations, modifications, and alternative embodiments thereof.

In some embodiments, a user can switch between selectable elements by providing input to an input device (e.g., input device 200). For example, a user may control the movement of a cursor and select one of several elements by clicking on it (e.g., a button assigned to a highlighting function). In some cases, a button or group of buttons may cycle between selectable elements (e.g., selectable elements 1420 and 1470). Referring to FIG. 14, a user can cycle between sub-elements 1430-1450 by moving input device 200 and/or pressing buttons programmed to cycle between sub-elements. For example, a user may select the spreadsheet (e.g., selectable element 1420) by moving a cursor (or cursorless movement) toward the spreadsheet and away from the hyperlink (e.g., selectable element 1470). Once selected, the user may cycle between sub-element via a corresponding button press (e.g., button designated to cycle through selectable elements/sub-elements to highlight) or input device movement. In the case where row 1430 is selected and highlighted, a subsequent button press may switch to column 1440, followed by cell 1450 in response to a third button press. In some embodiments, once row 1430 is selected, subsequent movement may highlight other rows. This concept can apply to column and cell selection.

In some embodiments, multiple functionality can be applied to particular selectable elements. For example, when the overlay software determines that selectable element 1420 is a spreadsheet, and further identifies individual rows, columns, and cells, it may analyze the size of the corresponding text and automatically apply a magnifying feature (1460) in addition to highlighting so that small text and details may be more easily seen. In some cases, multiple functions can be either automatically or manually configured. One of ordinary skill in the art would understand the many variations, modifications, and alternative embodiments thereof.

In some embodiments, the image processing may be a real-time and/or dynamic process. For example, a spreadsheet may have hundreds of rows of data, with only a small subset to appear on a slide at one particular time. The overlay software can detect when a user, for example, scrolls an embedded spreadsheet, which causes a change in the image. As indicated above, the overlay software may recognize the spreadsheet as a number of recognizable shapes and sizes that can be independently highlighted—not necessarily as a cell in a functional spreadsheet application. Thus, when scrolling occurs, which can be a change in the identified shapes of selectable elements and sub-elements, the image processing can update the image and it's corresponding elements/sub-elements. The identification can be performed in real-time, periodically, in response to detecting a change to the image, or at any suitable frequency or in response to any event. One of ordinary skill in the art would understand the many variations, modifications, and alternative embodiments thereof.

Figure 15A:
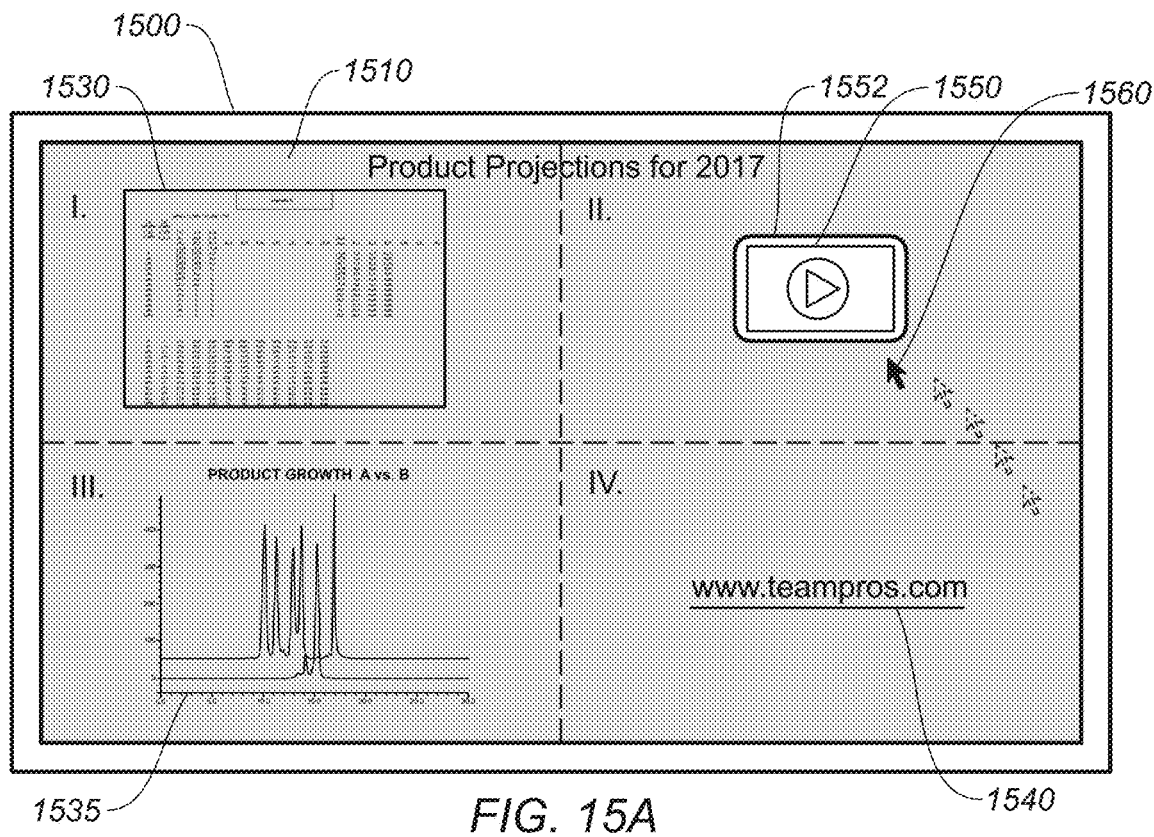
FIG. 15A shows aspects of determining a selectable element to highlight on a display, according to certain embodiments.
Figure 15B:
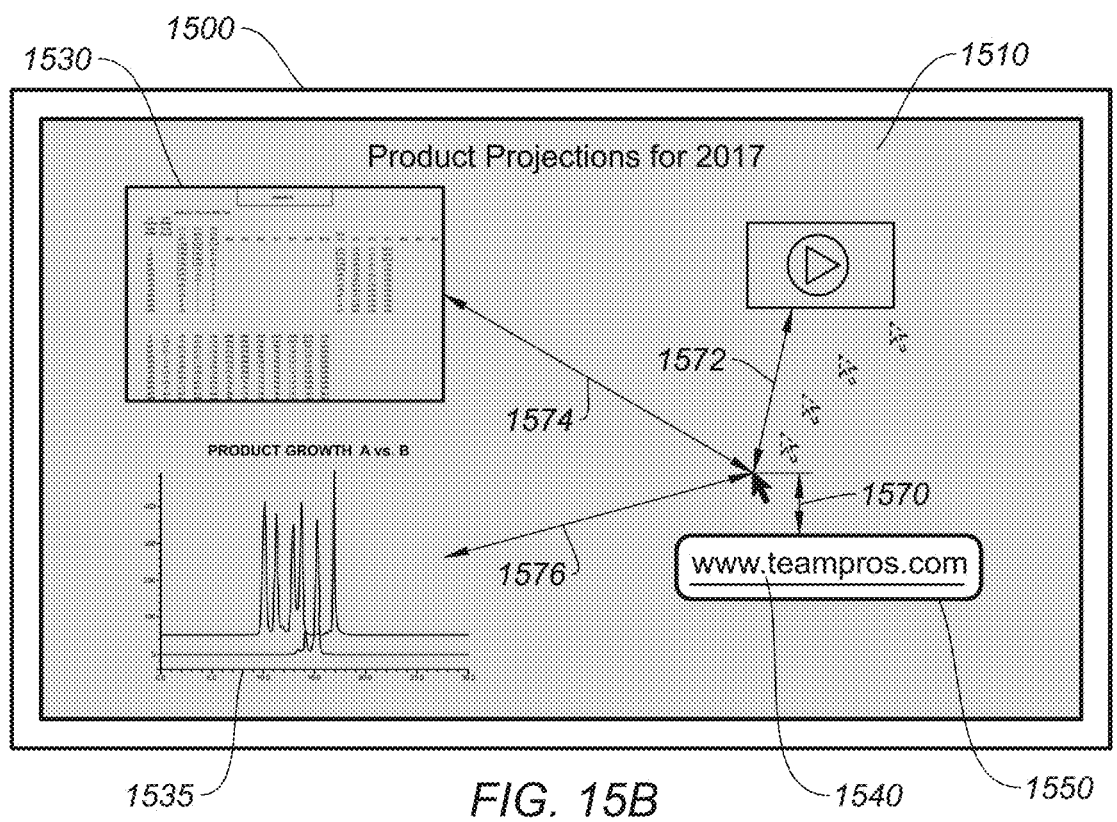
FIG. 15B shows aspects of determining a selectable element to highlight on a display, according to certain embodiments.

There are various ways that a selectable element can be selected for highlighting. For example, a user may move a cursor (e.g., via input device 200) over a selectable element (identified by image processing via overlay software) and select it. Alternatively or additionally, a user can move a cursor towards a selectable element and the overlay software can determine an intended element to highlight. FIGS. 15A and 15B illustrate two different methods of selecting a selectable element to highlight, according to certain embodiments.

FIG. 15A shows aspects of determining a selectable element to highlight on a display, according to certain embodiments. Display 1500 includes a window 1510 (e.g., presentation slide) divided into four quadrants I-IV. In the embodiment shown, selectable element 1530 is a spreadsheet in quadrant I, selectable element 1550 is a media player in quadrant II, selectable element 1535 is a graph in quadrant III, and selectable element 1540 is a hyperlink in quadrant IV. A selectable element can be selected for highlighting by moving a cursor into a particular quadrant. This may be advantageous if cursor movement is highly sensitive (e.g., very fast moving) or if the elements are very small and difficult to select with a cursor, for example. Referring to FIG. 15A, a user moves cursor 1560 from quadrant IV to quadrant II and the media player is automatically highlighted 1552. In some cases, if the cursor is in any location of a quadrant, the corresponding selectable element within that quadrant can be highlighted. There may be occasions where multiple selectable elements are located within a single quadrant. In such cases, quadrant selection in combination with cycling (see description above with respect to FIG. 14) can be implemented. One of ordinary skill in the art would understand the many variations, modifications, and alternative embodiments thereof.

FIG. 15B shows aspects of determining a selectable element to highlight on a display, according to certain embodiments. A selectable element can be selected for highlighting based on its relative distance from a cursor. For example, the closest selectable element (or sub-element) may be selected for highlighting. Referring to FIG. 15B, display 1500 includes a window 1510 (e.g., presentation slide) with selectable elements 1530, 1535, 1540 and 1550. Cursor 1560 is located at a first distance 1570 from the hyperlink (selectable element 1540), a second distance 1572 from the media player (selectable element 1550), a third distance 1574 from the spreadsheet (e.g., selectable element 1530), and a fourth distance 1576 from the graph (selectable element 1535). The distance can be measured using any suitable units of measurement including DPI or other suitable metric, as would be understood by one of ordinary skill in the art. Cursor 1560 is closest to the hyperlink, which is highlighted accordingly (highlight 1552). Although two methods of determining which element should be highlighted are described here, any suitable highlighting algorithm can be used. In some of the embodiments shown in the various figures, the highlighting scheme conforms to the shape of the selectable element or sub-element to be highlighted. In some cases, the highlight may have rounded edges, sharp edges, or may be a different shape than the underlying selected element. Any form of highlighting, including its shape, size, color, texture (e.g., patterns), or the like, can be used. One of ordinary skill in the art would understand the many variations, modifications, and alternative embodiments thereof.

Although many of the embodiments described herein generally describe an input device such as a presenter (e.g., input device 200) and personal computers (e.g., host computing device 210), the various concepts may be applied to other types of input devices and computing devices, as would be understood by one of ordinary skill in the art. For instance, aspects of system 1700 (e.g., operating input device 200) can be included in a computer mouse, track ball controller, video game controller, remote controller (e.g., for a television), or other suitable device. Host computing device 210 can be a home entertainment system or any suitable system (e.g., operated by aspects of system 1600). Some of the embodiments herein describe the use of buttons, movement detection, and/or touch detection to implement some of the functions described herein (e.g., highlighting, magnification, etc.), however other methods of input can be used, such as voice control. Some embodiments may combine some of the functions described herein. For instance, pressing a button on input device 200 may cause a host computer to play a media file on a media player. However, pressing and holding the same button may cause a volume control function modulated by, e.g., moving input device 200 up and down. Similarly, pressing a button may select an image (e.g., .jpg), while pressing and holding may display the image in full screen mode with a zoom and highlight features applied. In some cases, the size of a highlight or amount of magnification can change based on characteristics of the graphical content. Very small text may include high magnification, and large text may include relatively smaller magnification. Some embodiments may switch between magnification (e.g., amount of magnification) modes or highlight modes (e.g., shape/size/color of highlighted area). Some highlighting may include hard borders (e.g., solid lines), soft borders (e.g., fading or graded edge), dynamic effects (e.g., animations when switching image from regular to full screen mode), or the like. One of ordinary skill in the art would understand the many variations, modifications, and alternative embodiments thereof, and the present disclosure should by no means limit the myriad applications that are possible, whether explicitly described or not.

Exemplary Host Computing Systems Implementing Embodiments Herein

Figure 16:
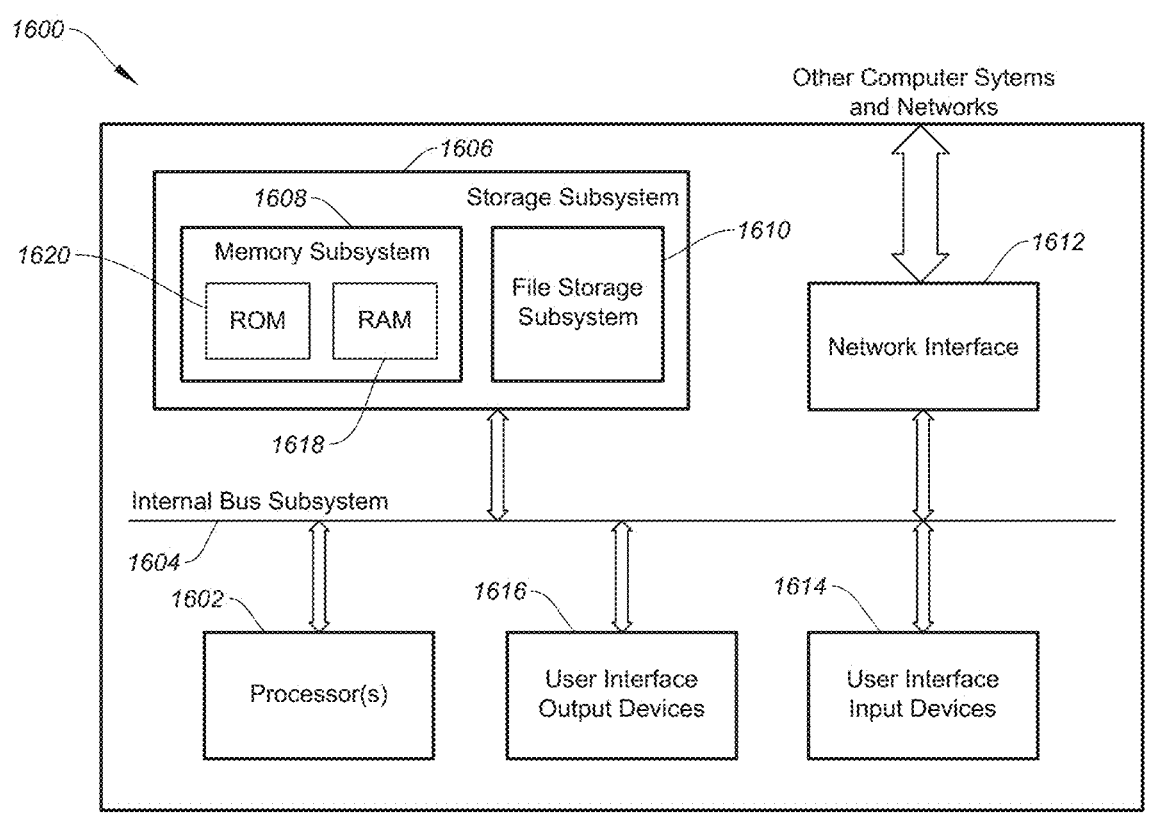
FIG. 16 shows a system for operating host computing device, according to certain embodiments.

FIG. 16 shows a system for operating a host computing device, according to certain embodiments. Computer system ("system") 1600 can be used to implement any of the host computing devices discussed above with respect to FIGS. 1-15. Computer system 1600 can include one or more processors 1602 that can communicate with a number of peripheral devices (e.g., input devices) via a bus subsystem 1604. These peripheral devices can include storage subsystem 1606 (comprising memory subsystem 1608 and file storage subsystem 1610), user interface input devices 1614, user interface output devices 1616, and a network interface subsystem 1612.

In some examples, internal bus subsystem 1604 can provide a mechanism for letting the various components and subsystems of computer system 1600 communicate with each other as intended. Although internal bus subsystem 1604 is shown schematically as a single bus, alternative embodiments of the bus subsystem can utilize multiple buses. Additionally, network interface subsystem 1612 can serve as an interface for communicating data between computer system 1600 and other computer systems or networks. Embodiments of network interface subsystem 1612 can include wired interfaces (e.g., Ethernet, CAN, RS232, RS485, etc.) or wireless interfaces (e.g., Bluetooth®, BLE, ZigBee®, Wi-Fi, cellular protocols, etc.).

In some cases, user interface input devices 1614 can include a presenter (e.g., input device 100/200), a keyboard, a pointing device (e.g., mouse, trackball, touchpad, etc.), a touchscreen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 1600. Additionally, user interface output devices 1616 can include a display subsystem, a printer, or non-visual displays such as audio output devices, etc. The display subsystem can be any known type of display device. In general, use of the term "output device" is intended to include all possible types of devices and mechanisms for outputting information from computer system 1600.

Storage subsystem 1606 can include memory subsystem 1608 and file storage subsystem 1610. Subsystems 1608 and 1610 represent non-transitory computer-readable storage media that can store program code and/or data that provide the functionality of embodiments of the present disclosure. In some embodiments, memory subsystem 1608 can include a number of memories including main random access memory (RAM) 1618 for storage of instructions and data during program execution and read-only memory (ROM) 1620 in which fixed instructions may be stored. File storage subsystem 1610 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art. Storage Subsystem 1606 can store the various host software implementations described with respect to FIGS. 1-15B (e.g., overlay software, software for "no sleep" functions, media detection software, highlighting software, etc., as further discussed above).

It should be appreciated that computer system 1600 is illustrative and not intended to limit embodiments of the present disclosure. Many other configurations having more or fewer components than system 1600 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

Examples of Systems for Operating an Input Device

Figure 17:
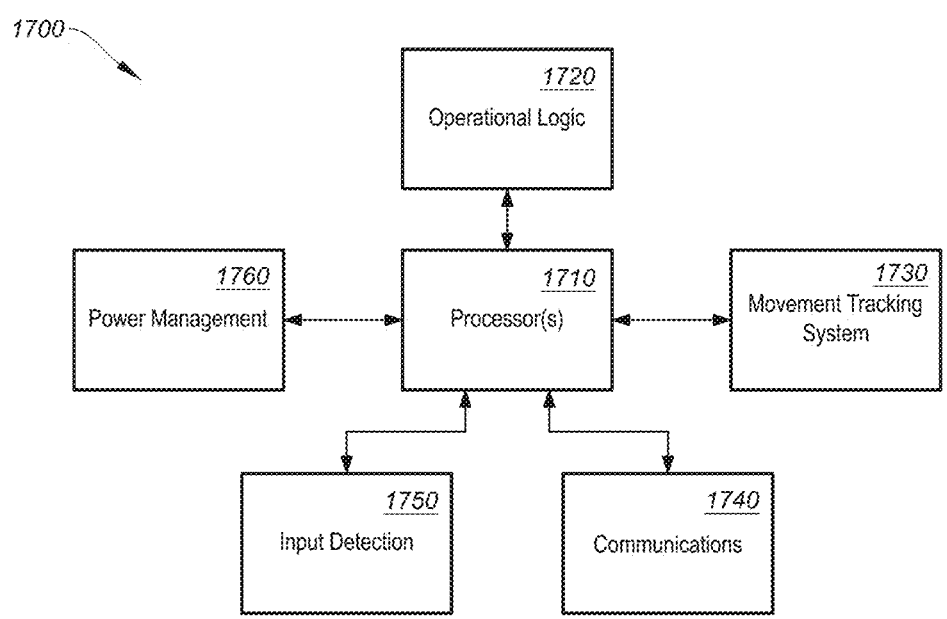
FIG. 17 shows a system for operating an input device, according to certain embodiments.

FIG. 17 is a simplified block diagram of a system 1700 configured to operate input device 100/200, according to certain embodiments. System 1700 includes processor(s) 1710, operational logic 1720, movement tracking system 1730, communications system 1740, input detection system 1750, and power management system 1760. Each of system blocks 1720-1760 can be in electrical communication with the processor(s) 1710. System 1700 may further include additional systems that are not shown or discussed to prevent obfuscation of the novel features described herein.

In certain embodiments, processor(s) 1710 can include one or more microprocessors (μCs) and can be configured to control the operation of system 1700. Alternatively, processor(s) 1710 may include one or more microcontrollers (MCUs), digital signal processors (DSPs), or the like, with supporting hardware and/or firmware (e.g., memory, programmable I/Os, etc.), as would be appreciated by one of ordinary skill in the art. Alternatively, MCUs, μCs, DSPs, and the like, may be configured in other system blocks of system 1700. For example, operational logic block may include a local processor to control the automatic receiver/BLE connection processes (e.g., see FIGS. 3-4), overlay processes (e.g., see FIGS. 5-7), or the like, described herein. In some embodiments, multiple processors may provide an increased performance in system 1700 speed and bandwidth. It should be noted that although multiple processors may improve system 1700 performance, they are not required for standard operation of the embodiments described herein.

Operational logic 1720 can include any combination of software, firmware, or hardware that can perform the various steps, operations, and functions associated with input device 100/200, as described above with respect to FIGS. 1-15B. For instance, operational logic 1720 can control the hierarchical connection scheme of input device 100/200, as described above with respect to FIGS. 2-4. Operational logic 1720 can control the various embodiments of the overlay functions described above with respect to FIGS. 5-7, and any of the other functions (e.g., highlighting, zoom, smart on/off, no sleep mode, etc.) described and/or supported in the present disclosure. Operational logic 1720 can be stored in any suitable non-transitory computer-readable storage media that can store program code and/or data that provide the functionality of embodiments of the present disclosure. That is, operational logic 1720 can store one or more software programs to be executed by processors (e.g., in processor(s) 1710). It should be understood that "software" can refer to sequences of instructions that, when executed by processing unit(s) (e.g., processors, processing devices, etc.), cause system 1700 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., auto-coupling—FIGS. 3-4.) as described herein. In some embodiments, the memory associated with operational logic 1720 can include RAM, ROM, solid-state memory, magnetic or optically-based memory systems, removable media (e.g., "thumb drives," SD cards, flash-based devices), or other types of storage media known in the art. One of ordinary skill in the art would understand the many variations, modifications, and alternative embodiments thereof.

Movement tracking system 1730 can be configured to track a movement of input device 100. In certain embodiments, one or more accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three-dimensional (3D) positioning. For example, 3D tracking can utilize a three-axis accelerometer or two two-axis accelerometers. Accelerometers can provide movement data that can include the velocity, physical orientation, and acceleration of input device 100. For example, movement tracking system 1730 can provide movement data to a host computer to control a cursor on a screen, as discussed above with respect to FIGS. 5-8. In some embodiments, gyroscope(s) can be used in lieu of or in conjunction with accelerometer(s) to determine movement or input device orientation. Movement tracking system 1730 can report movement information to processor(s) 1710.

Communications system 1740 can be configured to provide wireless communication between input device 100/200 and a host computing device, according to certain embodiments. Communications system 1740 can employ any suitable wireless communication protocol including, but not limited to Bluetooth®-based communication protocols (e.g., BLE), IR, ZigBee®, ZWire®, Wi-Fi (IEEE 802.11), Thread, Logi® protocols, or other suitable communication technology to facilitate wireless bidirectional communication between input device 100/200 and a host computing device (e.g., any of host computing devices 210, 220, 240, 250). System 1700 may optionally comprise a hardwired connection to a host computing device. For example, input device 100 can be configured to receive a Universal Serial Bus (e.g., USB-C) cable to enable bi-directional electronic communication between input device 100 and a host computing device. Some embodiments may utilize different types of cables or connection protocol standards to establish hardwired communication with other entities.

Input detection system 1750 can be configured to detect a touch or touch gesture on one or more buttons, touch sensitive surfaces, or the like, on input device 100, as further described above with respect to FIG. 1. Input detection system 1750 can include one or more touch sensitive surfaces, touch sensors, buttons, controls, or other user interface, as would be understood by one of ordinary skill in the art. Touch sensors generally comprise sensing elements suitable to detect a signal such as direct contact, electromagnetic or electrostatic fields, or a beam of electromagnetic radiation. Touch sensors can be configured to detect at least one of changes in the received signal, the presence of a signal, or the absence of a signal.

Power management system 1760 can be configured to manage power distribution, recharging, power efficiency, and the like, for input device 100. In some embodiments, power management system 1760 can include a battery (not shown), a USB based recharging system for the battery (not shown), power management devices, and a power grid within system 1700 to provide power to each subsystem (e.g., accelerometers, gyroscopes, etc.). In certain embodiments, the functions provided by power management system 1760 may be incorporated into processor(s) 1710. The power source can be a replaceable battery, a rechargeable energy storage device (e.g., super capacitor, Lithium Polymer Battery, NiMH, NiCd), or a corded power supply (e.g., via USB-C port—see FIG. 1). One of ordinary skill in the art would understand the many variations, modifications, and alternative embodiments thereof.

It should be appreciated that system 1700 is illustrative and that variations and modifications are possible. System 1700 can have other capabilities not specifically described here (e.g., mobile phone, global positioning system (GPS), power management, one or more cameras, various connection ports for connecting external devices or accessories, etc.). Further, while system 1700 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatuses including electronic devices implemented using any combination of circuitry and software. Furthermore, aspects and/or portions of system 1700 may be combined with or operated by other sub-systems as required by design. For example, operational logic 1720 may operate within processor(s) 1710 instead of functioning as a separate entity. The foregoing embodiments are not intended to be limiting and those of ordinary skill in the art with the benefit of this disclosure would appreciate the myriad applications and possibilities.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A computer-implemented method comprising:
 detecting a first window being displayed on a display of a host computing device;
 detecting graphical content on the first window;
 generating a second window on the display of the host computing device, wherein the second window is configured on a window layer above the first window;

changing graphical qualities of the second window overlay based on the detected graphical content of the first window;
detecting a selectable element in the graphical content;
identifying a sub-element enveloped by the selectable element;
determining a shape of the sub-element;
setting a transparency of an area around the sub-element on the second window to a first transparency; and
setting a transparency of a remainder of the second window overlay to a second transparency, such that the area around the sub-element is highlighted.

2. The computer-implemented method of claim 1 wherein the graphical qualities of the second window include at least one of a shape, size, color, transparency, or opacity of the overlay.

3. The computer-implemented method of claim 1 further comprising:
receiving input data corresponding to a movement of a cursor on the first window;
setting a transparency of an area around the cursor to a first transparency; and
setting a transparency of a remainder of the second window to a second transparency, such that the area around the cursor highlights a corresponding area of the graphical content on the first window.

4. The computer-implemented method of claim 3 further comprising:
determining a color associated with the graphical content on the first window;
determining a contrasting color based on the determined color; and
setting a color of at least a portion of the area around the cursor to the determined contrasting color.

5. The computer-implemented method of claim 1 further comprising:
receiving input data corresponding to a movement of a cursor on the first window;
defining an area around the cursor;
determining one or more colors associated with the graphical content inside the defined area around the cursor;
determining one or more colors associated with the graphical content outside the defined area around the cursor;
determining a visibility factor associated with a difference between the one or more colors associated with the graphical content inside the defined area around the cursor with the one or more colors associated with the graphical content outside the defined area around the cursor; and
setting a color of the area inside the defined area around the cursor based on the determined visibility factor.

6. The computer-implemented method of claim 1 wherein the selectable element is a first selectable element, the method further comprising:
detecting a second selectable element in the graphical content;
receiving input data corresponding to a movement of a cursor on the first window;
and
selecting one of the first selectable element or the second selectable element based
on the movement of the cursor,
wherein the setting the transparency is applied to the selected first or second selectable element.

7. The computer-implemented method of claim 1 wherein the selectable element is a first selectable element, the method further comprising:
detecting a second selectable element in the graphical content;
determining a location of the first selectable element and the second selectable element;
receiving input data corresponding to a movement of a cursor on the first window;
determining a distance between the cursor and the first and second selectable elements; and
selecting one of the first selectable element or the second selectable element based
on their corresponding distance to the cursor.

8. The computer-implemented method of claim 1 further comprising:
determining a shape of the selectable element;
receiving input data from an input device; and
switching between highlighting the selectable element and the sub-element based
on the received input data from the input device,
wherein when the selectable element is highlighted:
setting a transparency of an area around the selectable element on the second window to the first transparency; and
setting a transparency of a remainder of the second window to a second
transparency, such that the area around the selectable element is highlighted.

9. The computer-implemented method of claim 1 wherein the sub-element is a first sub-element, the method further comprising:
detecting a second sub-element of the selectable element;
receiving input data corresponding to a movement of a cursor on the first window; and
selecting one of the first sub-element or second sub-elements based on the movement of the cursor,
wherein the setting the transparency is applied to the selected first or second sub-element.

10. The computer-implemented method of claim 1 wherein the sub-element is a first sub-element, the method further comprising:
detecting a second sub-element of the selectable element;
receiving input data from an input device; and
switching between the first sub-element or second sub-elements based on the input data from the input device,
wherein the setting the transparency is applied to the selected first or second sub-element.

11. A computer-implemented system for establishing a wireless connection with a mobile input device, the system comprising:
one or more processors; and
one or more non-transitory computer-readable storage mediums containing instructions configured to cause the one or more processors to perform operations including:
detecting a first window being displayed on a display of a host computing device;
detecting graphical content on the first window;
generating a second window on the display of the host computing device, wherein the overlay is configured on a window layer above the first window; and
changing graphical qualities of the second window based on the detected graphical content of the first window;
detecting a selectable element in the graphical content;
identifying a sub-element enveloped by the selectable element;

determining a shape of the sub-element;
setting a transparency of an area around the sub-element on the second window to a first transparency; and
setting a transparency of a remainder of the second window to a second transparency, such that the area around the sub-element is highlighted.

12. The computer-implemented system of claim 11 wherein the graphical qualities of the second window include at least one of a shape, size, color, transparency, or opacity of the overlay.

13. The computer-implemented system of claim 11 wherein the one or more non-transitory computer-readable storage mediums further contain instructions configured to cause the one or more processors to perform operations including:
receiving input data corresponding to a movement of a cursor on the first window;
setting a transparency of an area around the cursor to a first transparency; and
setting a transparency of a remainder of the second window to a second transparency, such that the area around the cursor highlights a corresponding area of the graphical content on the first window.

14. A non-transitory computer-program product tangibly embodied in a machine-readable non-transitory storage medium that includes instructions configured to cause one or more processors to:
detect a first window being displayed on a display of a host computing device;
detect graphical content on the first window;
generate a second window on the display of the host computing device, wherein the second window is configured on a window layer above the first window;
change graphical qualities of the second window based on the detected graphical content of the first window;
detect a selectable element in the graphical content;
identifying a sub-element enveloped by the selectable element;
determine a shape of the sub-element;
set a transparency of an area around the sub-element on the second window to a first transparency; and
set a transparency of a remainder of the second window to a second transparency,
such that the area around the sub-element appears to be highlighted.

15. The non-transitory computer-program product of claim 14 wherein the graphical qualities of the second window include at least one of a shape, size, color, transparency, or opacity of the overlay.

16. The non-transitory computer-program product of claim 14 wherein the instructions are further configured to cause one or more processors to:
receive input data corresponding to a movement of a cursor on the first window;
set a transparency of an area around the cursor to a first transparency; and
set a transparency of a remainder of the second window to a second transparency, such that the area around the cursor highlights a corresponding area of the graphical content on the first window.

* * * * *